US008641133B1

(12) United States Patent
Scaringe et al.

(10) Patent No.: US 8,641,133 B1
(45) Date of Patent: Feb. 4, 2014

(54) HIGH STRENGTH LIGHTWEIGHT VEHICLE AND AN IMPROVED METHOD FOR PRODUCING SAME

(76) Inventors: Robert Joseph Scaringe, Rockledge, FL (US); Celyn Morgan Evans, Rockledge, FL (US); Christopher Wilson Auerbach, Melbourne, FL (US); Brian James Gase, Melbourne, FL (US); Adrian N. A. Elliott, Rockledge, FL (US); Seth Robert Moczydlowski, Orlando, FL (US)

( * ) Notice: Subject to any disclaimer, the term of this patent is extended or adjusted under 35 U.S.C. 154(b) by 0 days.

(21) Appl. No.: 13/269,647

(22) Filed: Oct. 10, 2011

(51) Int. Cl.
*B62D 27/02* (2006.01)

(52) U.S. Cl.
USPC ............. 296/193.03; 296/193.04; 296/203.01

(58) Field of Classification Search
USPC ............. 296/193.01, 193.03, 193.08, 193.09, 296/203.01, 203.02, 203.04, 29, 191; 29/897.2
See application file for complete search history.

(56) References Cited

U.S. PATENT DOCUMENTS

| | | | | |
|---|---|---|---|---|
| 2,880,032 A * | 3/1959 | Barenyi | ................... | 296/203.01 |
| 4,045,075 A | 8/1977 | Pulver | | |
| 4,428,599 A * | 1/1984 | Jahnle | ........................... | 280/784 |
| 4,533,172 A * | 8/1985 | Oliver | ....................... | 296/203.01 |
| 4,660,345 A | 4/1987 | Browning | | |
| 4,735,355 A | 4/1988 | Browning | | |
| 4,759,489 A | 7/1988 | Pigott | | |
| 4,950,026 A * | 8/1990 | Emmons | ................... | 296/203.01 |
| 4,986,597 A | 1/1991 | Clausen | | |
| 5,092,649 A * | 3/1992 | Wurl | .............................. | 296/103 |
| 5,209,541 A * | 5/1993 | Janotik | ........................... | 296/29 |
| 5,338,080 A | 8/1994 | Janotik et al. | | |
| 5,343,666 A | 9/1994 | Haddad et al. | | |
| 5,480,208 A | 1/1996 | Cobes et al. | | |
| 5,549,352 A * | 8/1996 | Janotik | ......................... | 296/209 |
| 5,660,428 A * | 8/1997 | Catlin | .......................... | 296/205 |
| 5,715,643 A | 2/1998 | Parkinson | | |
| 5,767,476 A | 6/1998 | Imamura | | |
| 5,882,064 A * | 3/1999 | Emmons | ................... | 296/193.04 |
| 5,954,364 A * | 9/1999 | Nechushtan | ................... | 280/781 |
| 5,975,625 A * | 11/1999 | Simplicean | ................... | 296/205 |
| 6,010,182 A * | 1/2000 | Townsend | ................ | 296/203.01 |
| 6,073,991 A * | 6/2000 | Naert | ....................... | 296/187.02 |
| 6,102,472 A * | 8/2000 | Wallstrom | ............... | 296/203.01 |
| 6,116,680 A * | 9/2000 | Hunter et al. | ............. | 296/203.03 |
| 6,296,301 B1 * | 10/2001 | Schroeder et al. | ........ | 296/187.02 |
| 6,493,920 B1 | 12/2002 | Hill et al. | | |
| 6,666,501 B1 * | 12/2003 | Logan et al. | .............. | 296/193.07 |
| 6,685,254 B2 * | 2/2004 | Emmons et al. | ............... | 296/178 |
| 6,719,364 B2 | 4/2004 | Hoppenstein | | |
| 6,817,656 B2 * | 11/2004 | Stoffels et al. | ........... | 296/203.02 |

(Continued)

*Primary Examiner* — Glenn Dayoan
*Assistant Examiner* — Gregory Blankenship

(57) ABSTRACT

A high-strength-per-unit-weight spaceframe-like vehicle has a front subassembly, a core frame and a rear subassembly configured to be bolted together, forming a spaceframe core platform. A roof structure assembly of formed, extruded or stamped components is bolted to the spaceframe core platform in a common plane and height. Closure panels common to a vehicle family style are provided, and non-load bearing colored panels defines the vehicle body color. A vehicle assembly method includes bolting together a plurality of sub-assemblies, bolting a roof structure assembly to the core platform, installing at a plant closure panels common to a vehicle family style, and thereafter installing a series of non-structural colored panels defining the vehicle body color and having only aesthetic and aerodynamic functionalities as the last assembly step in the plant or optionally at the point of sale or the other location outside the plant.

20 Claims, 22 Drawing Sheets

(56) References Cited

U.S. PATENT DOCUMENTS

| | | |
|---|---|---|
| 6,824,204 B2 | 11/2004 | Gabbianelli et al. |
| 6,926,351 B2 * | 8/2005 | Telehowski et al. ..... 296/203.03 |
| 7,000,978 B1 | 2/2006 | Messano |
| 7,025,166 B2 * | 4/2006 | Thomas ........................ 180/311 |
| 8,226,159 B2 * | 7/2012 | Di Camillo .............. 296/203.01 |
| 8,383,242 B2 * | 2/2013 | Malek et al. ................... 428/458 |
| 2008/0169684 A1 * | 7/2008 | Hedderly ................. 296/203.01 |
| 2008/0169685 A1 * | 7/2008 | Hedderly ................. 296/203.01 |

\* cited by examiner

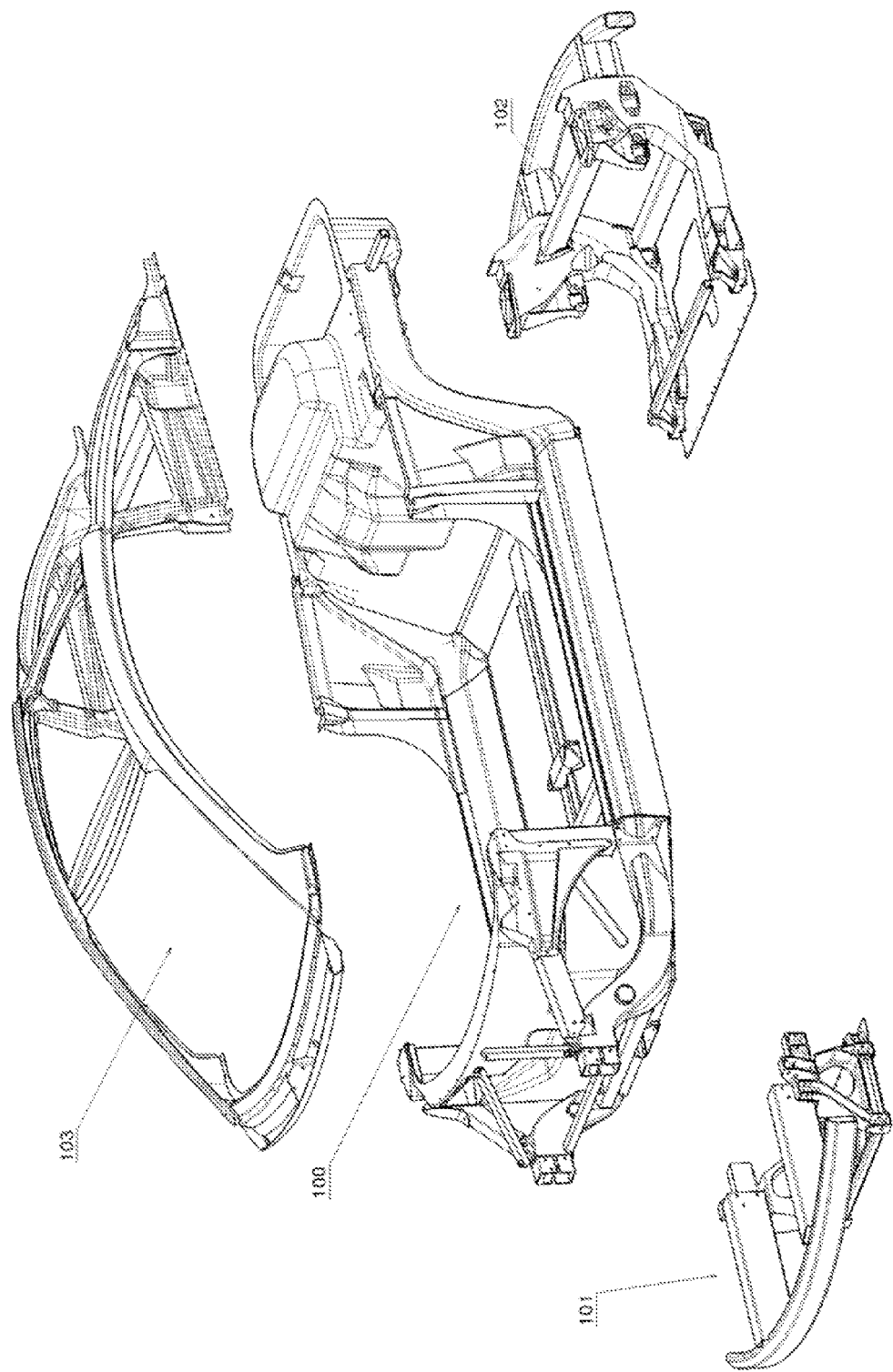

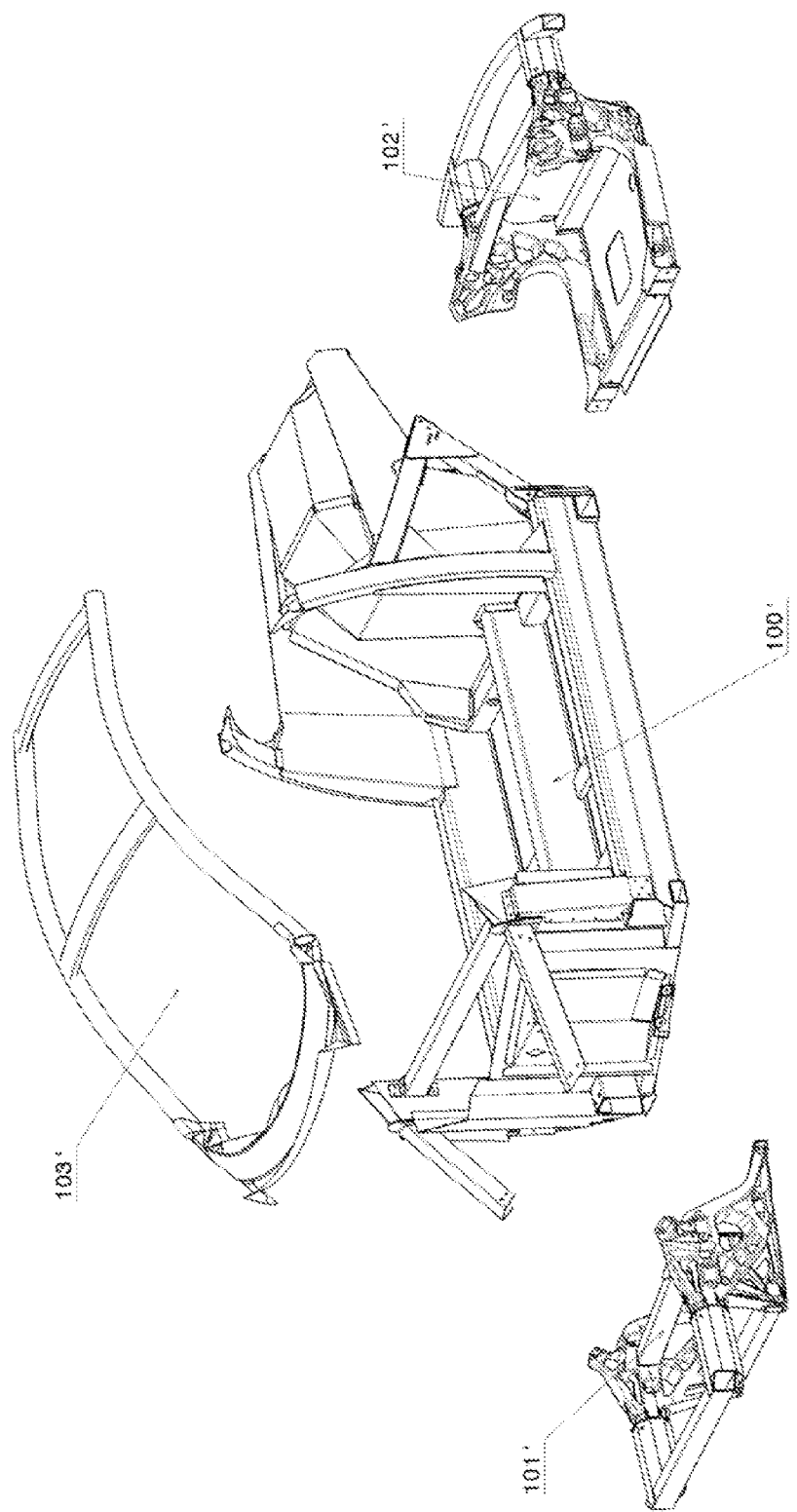

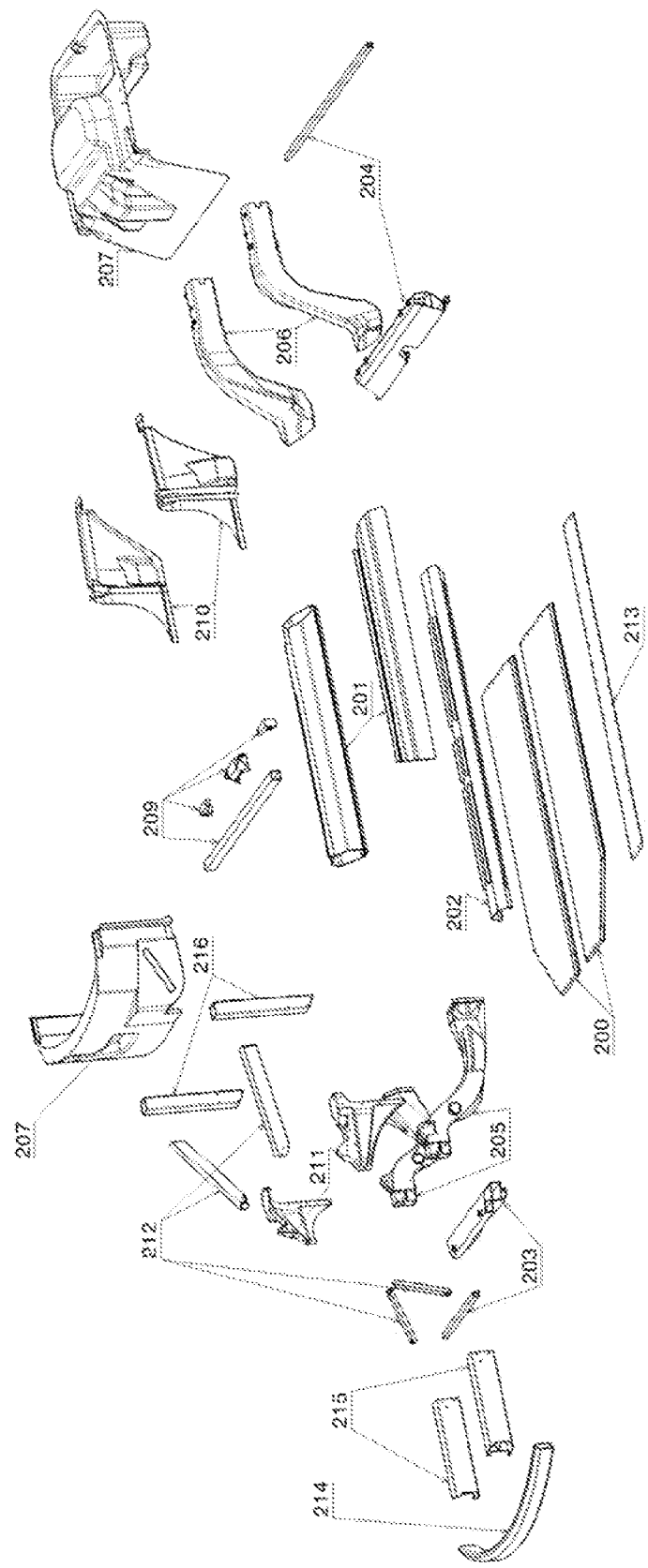

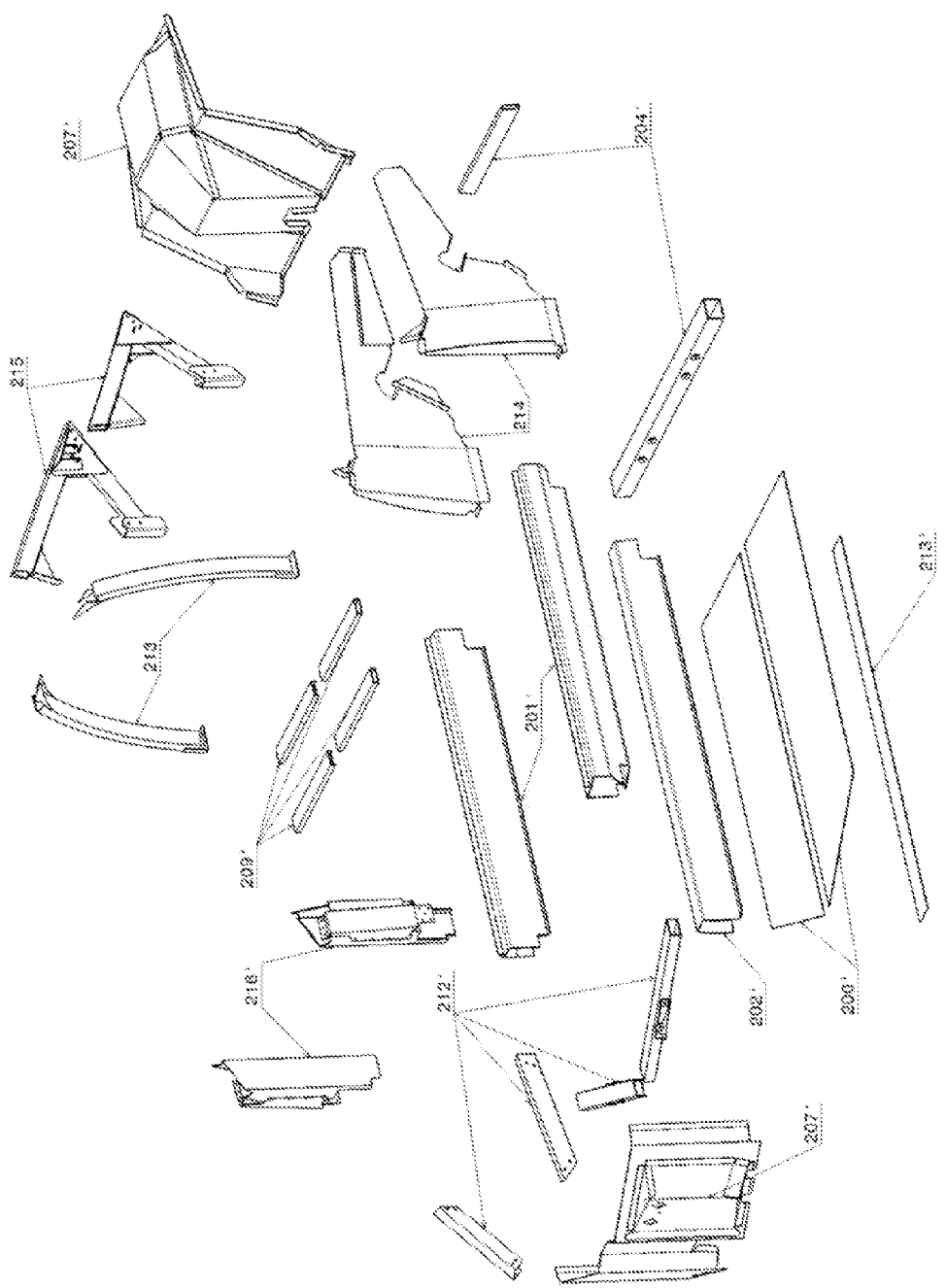

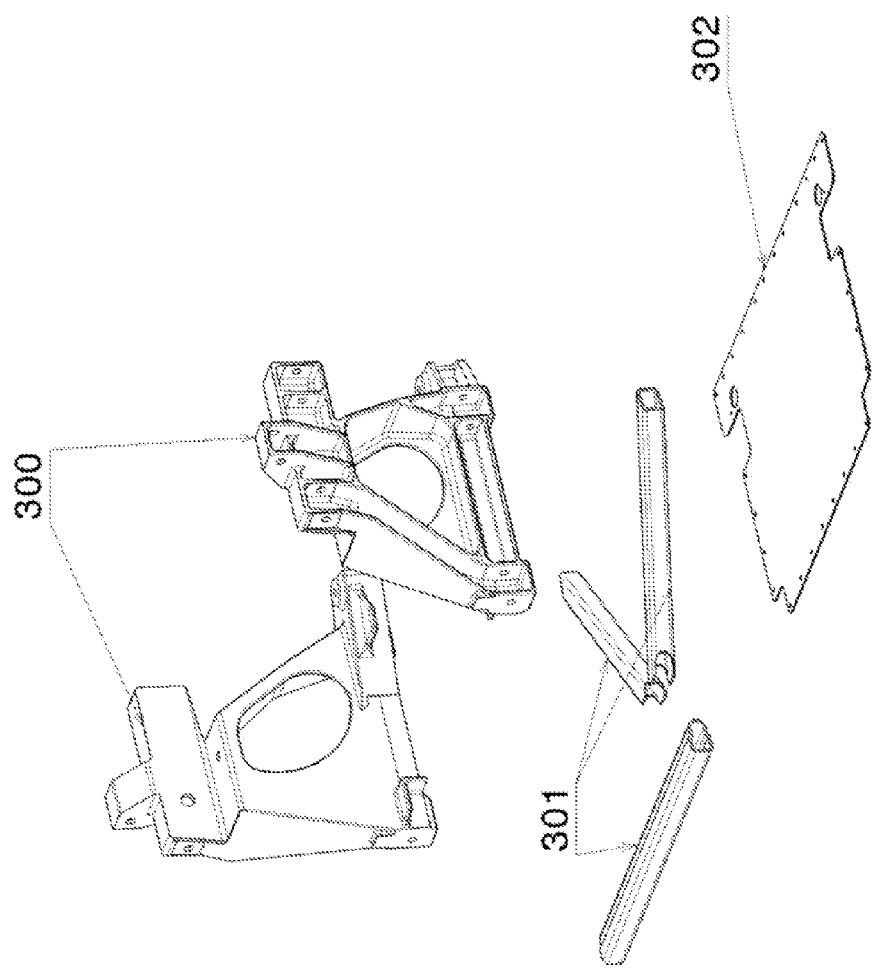

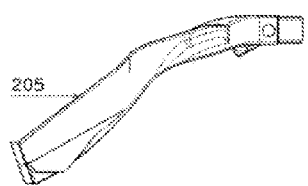
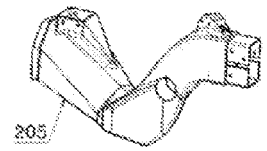
Figure 15a  Figure 15b
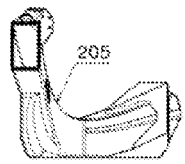
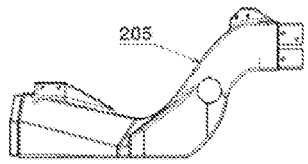
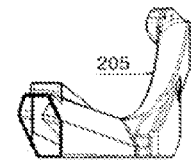
Figure 15c  Figure 15d  Figure 15e
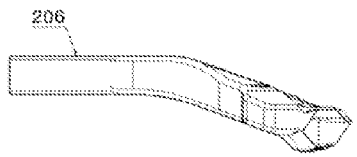
Figure 16a  Figure 16b
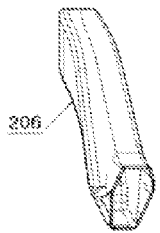
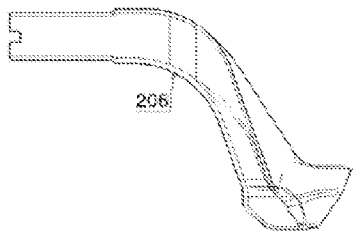
Figure 16c  Figure 16d  Figure 16e

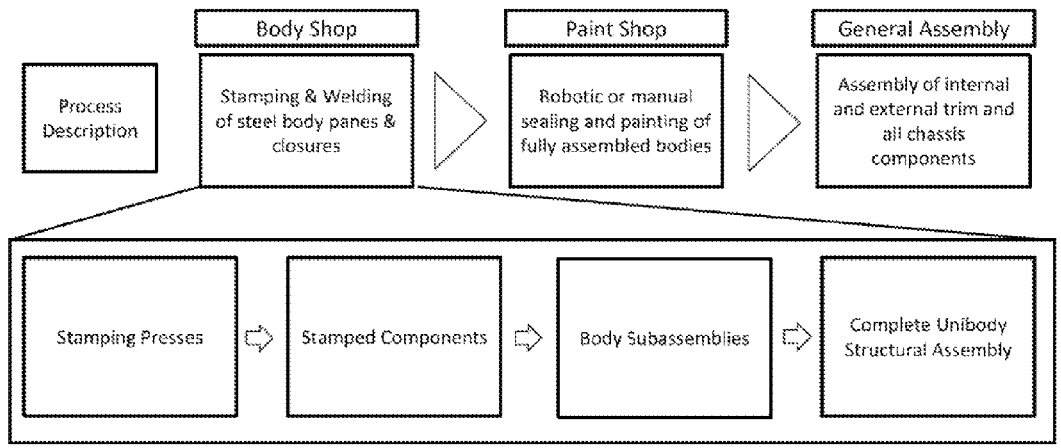
*Figure 17 – Prior Art*
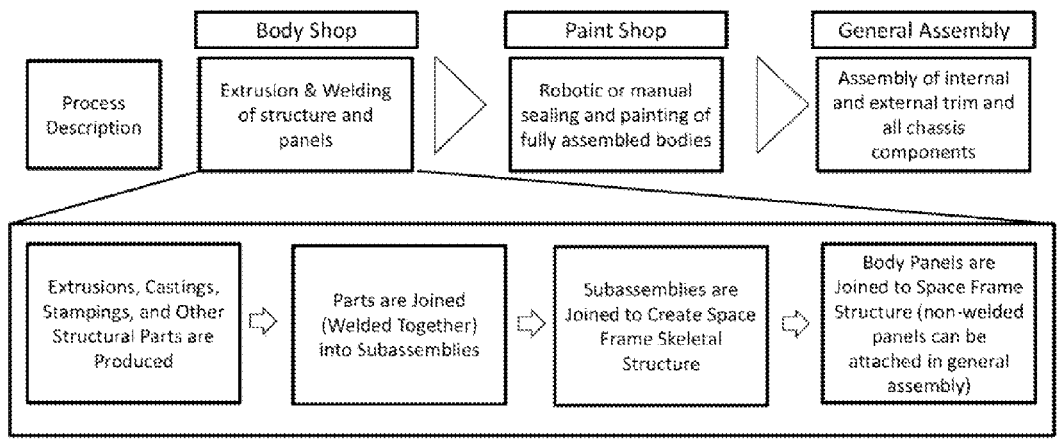
*Figure 18 – Prior Art*

HIGH STRENGTH LIGHTWEIGHT VEHICLE AND AN IMPROVED METHOD FOR PRODUCING SAME

BACKGROUND AND SUMMARY OF THE INVENTION

This invention relates to an improved automobile construction and a method of manufacturing and assembling such an automobile that provides for greater structural strength per unit weight and simplified assembly relative to traditionally produced monocoque and spaceframe vehicles.

Conventional manufacturing methods for assembling either a monocoque or spaceframe vehicle as shown, for example, in FIGS. 17 and 18 are capital intensive processes that include, as a generalization, a body shop where the structural panels are assembled, a paint shop where the structure is coated and painted, and a general assembly line where all other components are added to the structure. In these known methods the general material flow for the vehicle structure is from raw materials to a body shop, usually via a stamping plant for a monocoque or an extruder for many of the structural parts in a spaceframe, where the parts are assembled into the complete vehicle structure. This vehicle shell or frame, called the body in white, is then sent to a paint shop where it is coated and painted as a complete structure. After painting, trim and other components are added to the structure during the final assembly process.

More specifically, the standard production process for automotive bodies manufactured in mass production is to stamp the panels, typically out of steel, assemble these panels into subassemblies, almost exclusively through spot or laser welding, and then assemble these subassemblies, again by welding, into a vehicle body. Multiple stamping tools are used to form each of the components that make up every subassembly, and an additional assortment of tools or robots are used to assemble the components. As a simplification, the major subassemblies of the underbody, side assemblies, and roof assembly can be used to depict the structure of a typical full vehicle body in white assembly process. The first step of the simplified whole vehicle assembly process is to place the underbody subassembly on a framing fixture. Then the two side subassemblies (passenger and driver side subassemblies) are loaded into the fixture, located, and secured. U.S. Pat. No. 5,480,208 discloses a method of accurately aligning the body side panels. This step is followed by adding the roof assembly to the top of the structure, generally in a separate fixture from the bodyside installation, to form the vehicle body structure. All other structural subassemblies are then added to the vehicle body structure forming the complete body in white. The closure panels (doors) are then secured to the body in white to form the entire vehicle body construction. This is the stage at which traditional vehicles are painted before all of the other components and trim are assembled to the structure.

The traditional method as described above is not the only known method for assembling a monocoque or unibody vehicle from stamped panels. As a deviation from the method of assembling the two side panels to the floor panel followed by the roof panel, for example, U.S. Pat. No. 4,759,489 discloses a method of building an automotive body in separate upper and lower body modules, referred to as the roof area and floor area respectively. Another fabrication approach is discussed in U.S. Pat. No. 6,493,920 where an open-top cab module is assembled to create a metal base frame. The exterior body panels are then attached to the base frame and the interior cab module trim components are installed. The roof is subsequently fitted onto this trimmed out lower vehicle section. These are examples of assembly techniques for unibody construction as shown in FIG. 17.

As a completely separate vehicle architecture from a unibody construction, a spaceframe design utilizes a rigid framework for the body structure in place of the multitude of formed panels. The spaceframe architecture is used in some limited production vehicles but is more typically used in highly specialized vehicles where the design and manufacturing is unique to the specific vehicle, as is the case with many racing vehicles. For example, U.S. Pat. No. 6,719,364 shows a roll cage type spaceframe attached to a floor pan and a "unitary structure of cage sufficient to accommodate both passenger and power plant" (Col 3, lines 42-43) where the exterior body panels are attached from the inside (Col 3, lines 51-52). Other patents related to spaceframe vehicle construction include the one-piece spaceframes as discussed in U.S. Pat. Nos. 4,735,355; 4,660,345; 4,045,075; and 6,824,204. Various methods of joining the components in a spaceframe are described in U.S. Pat. Nos. 5,338,080; 4,986,597; 5,767, 476; 5,715,643; and 5,343,666.

In other words, the traditional method for assembling the body of a mass-produced vehicle is through stamped steel body panel construction while an alternative method to create the vehicle structure which is less mainstream, but successfully used in the industry, is spaceframe construction. Both of these body construction methods use a common, traditional assembly procedure for the trim, hardware, and other components as above described and shown in FIGS. 17 and 18. In short, the components outside of the vehicle cabin are attached to the structure and the components, such as the interior trim, that exist inside of the vehicle body are passed through the door openings of the vehicle's body and attached to the structure. The internal components can be loaded and installed with or without the door installed, in the former case the door must simply be opened to pass components into interior of the vehicle. In either case, the components enter the fully assembled vehicle structure through either the front or rear side door openings before being attached. The exception to this is in a limited number of vehicles where the roof is not installed as a part of the structure during the trim assembly process. This allows the option of installing components to the interior of the vehicle cabin by passing them through the open roof area in addition to the open door areas. Even in the known roof-off fabrication methods, the vehicle base is still completely assembled in the traditional manner with the only significant difference being that the interior components can be installed through the open roof access instead of relying on only the door and window openings. For example, none of these assembly approaches utilize a door assembly method whereby the door components can be assembled to the door, either before or after the doors are attached to the body, by loading them to the cavity between the doors interior and exterior panels from the outside of the vehicle prior to the installation of the exterior panel as shown in FIG. 13.

A vehicle with the traditional stamped body panel construction involves an exorbitant manufacturing cost from both tooling and assembly points of view. The creation of all the large stampings that make up the structure is tooling intensive and the body shop required to assemble the structure adds significant additional costs for a new vehicle model. In order to amortize these substantial costs, a manufacturing plant may need to build as many as one hundred thousand vehicles per year over a model life of four to six years. This vehicle architectural approach requires a high volume production or high pricing to offset the upfront capital, lacks manufacturing flexibility as a result of the highly formed parts that are not easy to change, and does not easily allow the ability to change designs after only one or two model years. Such a system is not well suited for profitably producing vehicles in smaller volumes. The alternative design methodology of a spaceframe reduces the upfront costs by eliminating many of the formed parts from the vehicle structure. Both of these vehicle architectures have been nearly exclusively applied to painted vehicles in which the assembled structure is coated and painted after the welding is completed. The substantial capital investment and plant floor space required for a paint line at the assembly plants further restrict the flexibility and inhibit creation of manufacturing facilities in light industrial zones.

In spite of the advancements made in spaceframe construction, lightweight vehicles and manufacturing techniques, there remains a pressing need to further enhance safety, improve fuel economy and reduce manufacturing and distribution costs. In contrast to the traditional manufacturing processes mentioned above, an object of the present invention is to provide a method of design, fabrication and repair which creates a vehicle architecture that can be produced without a high tooling investment for stamped body panels, without a capital intensive body shop to assemble the structure, and without the need for a cost prohibitive paint line. These production attributes provide flexibility, modularity, and ease of fabrication and repair with the intent to significantly reduce investment costs.

Another object is to achieve a vehicle architecture that reduces weight, improves impact performance, dramatically increases production flexibility, allows for shorter design time between models, and creates a streamlined delivery system to reduce vehicle inventories and eliminate excessive volumes. This invention is able to achieve these and other objectives by radically departing from the steel unitized body approach or singular spaceframe structure and instead utilize a modular, multi-material, spaceframe architecture.

One aspect of the present invention is a platform comprised of a core frame, a front sub-frame, a rear sub-frame, and a roof subassembly, all of which are all bolted together. (The term "bolted" as used in this disclosure refers to a semi-permanent fastening system which can be disconnected with reasonable effort and the use of only common hand tools.) The core sub-frame is basically the structural boundary of the occupant compartment that exists below the belt line. In an embodiment of the present invention the core sub-frame can also contain the front impact mitigation structure as a design that increases the crush zone. The front sub-frame holds the steering, front tires and suspension, and other front mounted components. An embodiment of the present invention also includes the front crush structure as a part of the front sub-frame subassembly for an increased case of repair and assembly. The rear sub-frame holds the rear impact mitigation structure, rear tires and suspension, and other rear mounted components. The roof subassembly creates and seals off the vehicle cabin above the belt line and contributes to the vehicles structural performance and integrity while carrying the roof panel, windshield, trim, and other components. The novel vehicle platform configuration allows this roof system to be added to the vehicle after the interior trim is installed, essentially as one of the last components to be installed. Following the installation of the roof, the closures are hung on the vehicle without their exterior body panels. The exterior body panels are lightweight components that define the color of the vehicle and are decorative only. They provide no structural improvements or waterproofing features and are the last components installed on the vehicle. Because the body panels, which are the only parts to define the vehicle's color, are the last components to be installed they are able to be installed or swapped at the final point of sale based on the color choice of the buyer at the time of purchase.

Although using lightweight panels is discussed in U.S. Pat. No. 7,000,978, these panels utilize a ridge foam core for strength and form a one-piece vehicle body (Col. 3, line 18). Similar panels are also described in U.S. Pat. No. 6,010,182 which relates to chassis and body panel structural systems for a wide variety of vehicles. The latter patent discusses a node and interlocking spaceframe, body structure system that can be hand assembled in the field and is "adapted to releasably attach non-movable vehicle body panels to the chassis" (col 1, lines 54-55). These body panels lock into the spaceframe so that the panels 'become full load bearing members within the overall structure" (Col. 3, lines 13-14). In both of these panel constructions, however, the lightweight panels are structurally integral to the vehicle. With the assembly methodology of the present invention, the panels are attached to the structure primarily to define the look of the vehicle but contribute no additional functionality other than managing air flow around the vehicle. This enables the design to be refreshed by replacement of these panels without any effect on the structural characteristics of the vehicle. Furthermore, with the replacement of these panels and the roof system, an entirely new vehicle design can be put on the same platform.

The improvement in structural strength using the methodology of the present invention also allows for the production of a lighter vehicle, which results in improved handling and fuel efficiency. The reduced assembly complexity leads to lowered manufacturing cost and easier field serviceability with a subsequent reduction in repair costs. The simplified assembly also results in an increase in manufacturing flexibility, allowing the production of different vehicles with minimal tooling/production changes, and removes the capital intensive processes of die-stamping operations, major body shop welding operations, and the painting operations from the vehicle assembly plant. In addition, this assembly method enables point of sale customization, reducing inventory and the need for sales incentives.

BRIEF DESCRIPTION OF THE DRAWINGS

These and further objects, features and advantages of the present invention will become more readily apparent from the following detailed description when taken in conjunction with the accompanying drawings wherein a currently contemplated embodiment of the present invention is described and shown, and wherein:

FIGS. 1a-1c are exploded perspective views showing separate embodiments of the four structural subassemblies of the vehicle in accordance with the present invention:

FIGS. 2a-2c are exploded perspective views of the core frame assemblies shown assembled in the three embodiments, respectively, of FIGS. 1a-1c;

FIGS. 3a-3c are exploded perspective views of the front sub-frame shown assembled as the three unique embodiments, respectively, of FIGS. 1a-1c;

FIG. 4 is an exploded perspective view of the rear sub-frame shown assembled in FIG. 1a;

FIG. 5 is an exploded perspective view of the roof subassembly shown assembled in FIG. 1a;

FIGS. 15a-15e are different views of the left front heat form component shown assembled to the core frame in the embodiment shown in FIGS. 1a and 2a;

FIGS. 16a-16e are different views of the left rear heat form component shown assembled to the core frame in the embodiment shown in FIGS. 1a and 2a;

FIG. 17 is a generic flow diagram showing a conventional assembly sequence for a monocoque or unibody construction made from stamped panels as discussed above;

FIG. 18 is a generic flow diagram showing a conventional sequence for a spaceframe construction made from any combination of extrusions, stampings, castings, or other components as discussed above.

DETAILED DESCRIPTION OF THE DRAWINGS

The invention disclosed herein provides a unique method for the assembly of a vehicle as it relates to vehicle architecture, assembly methodology, capital investments, assembly plant size and complexity, and distribution. It includes a process that takes a vehicle through the entire assembly process to the point of sale in a manner that is unique and vastly different from the techniques common to most mass produced vehicles available in today's global market.

The unique process starts with the assembly plant. Traditional assembly plants as above described feature body shops where the stamped panels are assembled, paint shops where the assembled vehicles are painted, and final assembly lines where the non-structural elements are added to the vehicle. When the vehicle rolls off of this final line it is completely assembled and ready to be shipped to the point of sale. The present invention removes the need for both the body and paint shops as parts of the full vehicle assembly plant layout and avoids significant costs by assembling components that are coated or painted at supplier facilities prior to assembly at the vehicle assembly plant.

Figure 1C:
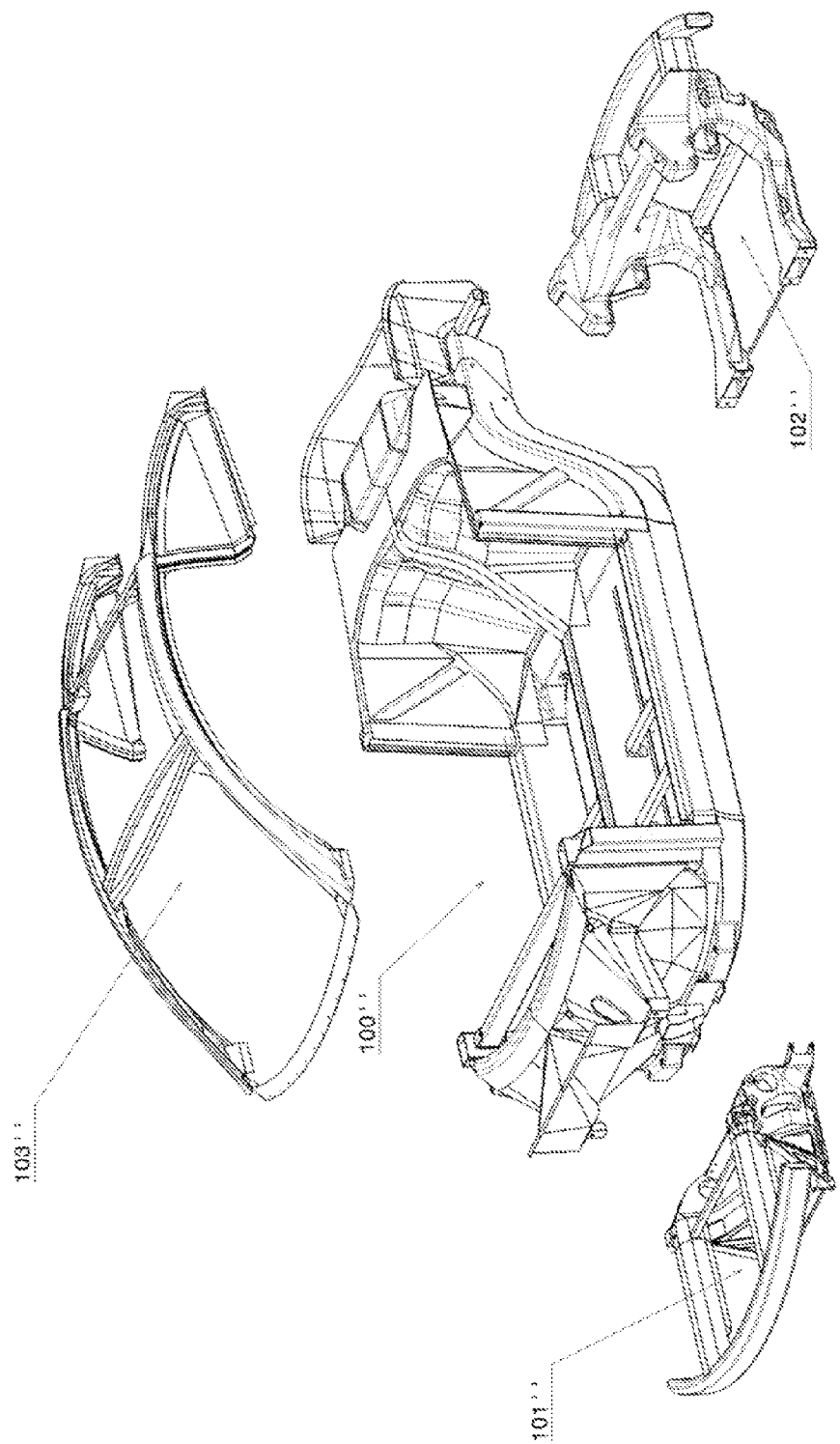

The body shop is removed because the vehicle is broken into subassemblies (FIGS. 1a-1c) which can be bolted together such that the structural parts are attached like trim components. The four subassemblies shown in FIG. 1a together form the vehicle platform that constitutes the full structure of the vehicle. They are a core frame 100, a front sub-frame 101, a rear sub-frame 102 and a roof subsystem 103. When bolted together, these four components form the vehicle platform that constitutes the full structure of the vehicle. The core frame 100 is made up of the floor and the front and rear of the cabin to create the sealed vehicle environment to which the other subassemblies are bolted. The front sub-frame 101 and rear sub-frame 102 carry the components of the front and rear ends respectively. In the embodiment of FIG. 1a, the front impact structure is attached to the core frame 100, enabling the energy mitigation zone to grow rearward and transfer directly via a bolted connection into the adjacent structure of the core frame. In the embodiment of FIG. 1b, the front impact structure is attached to the front sub-frame 101' providing greater manufacturing flexibility. In both embodiments the rear impact structure is a component of the rear sub-frame 102,102'. The roof sub-system 103, 103', 103" holds the glass and other components and bolts to the top of the core frame adding structure to the vehicle. Each of these subassemblies is a combination of structural and trim components prior to the full structure being assembled. While the combination of the four core subassemblies (e.g. 100, 101, 102, and 103) forms the overall vehicle structure, each subassembly is structurally rigid and dimensionally controlled so as to enable the four modules to be built up independently and easily attached to the core frame 100. This breakup of structural components that are bolted together is critical to the platform assembly process. More importantly, these bolted joints allow for ease or service while reducing the cost and complexity of repair. The use of bolted joints does not mean that the entire vehicle is constructed without welding but does present the opportunity to perform welding more advantageously on a subassembly level instead of at the full vehicle assembly level. This allows for a business partner or supplier to utilize existing equipment in their facilities to weld up each subassembly. The size and complexity of each subassembly is far reduced from that of a full vehicle and further allows for simplification in tooling and proper resource allocation to put each critical subassembly into the hands of those with expertise in that specific manufacturing methodology.

Figure 2C:
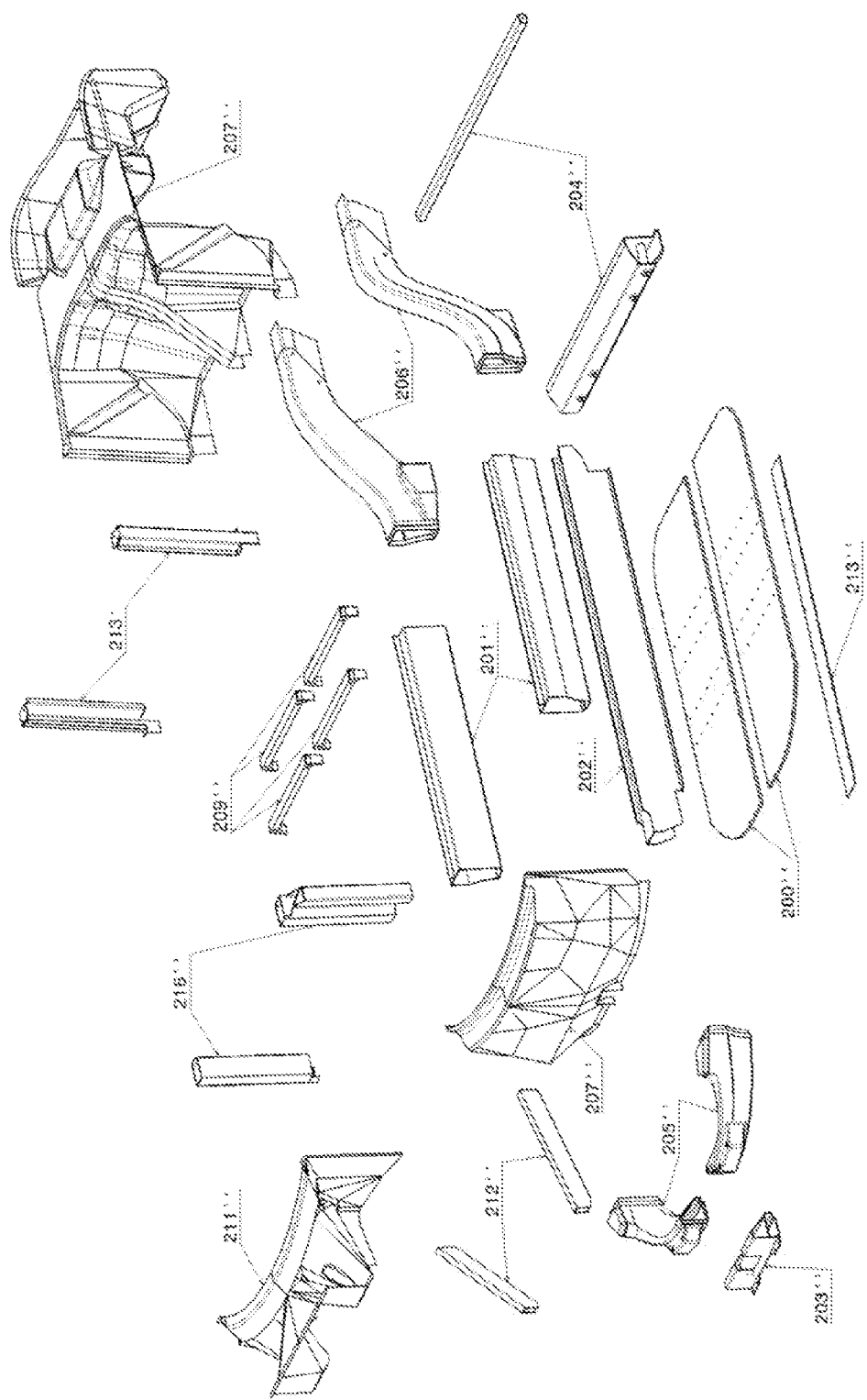

The four subassemblies that make up the structure of the vehicle are divided into two groups, the core platform and the roof. The core platform is the combination of the core frame 100, 100', 100" (FIG. 1a-1c), the front sub-frame 101, 101', 101" (FIGS. 1a-1c), and the rear sub-frame 102, 102', 102" (FIG. 1a-1c). Each of these three embodiments utilizes an amalgamation of extrusions, press-brake parts, stampings, injection molded panels, composite parts, and cast components. In the embodiment shown, for example, in FIGS. 1a, 2a, 3a, the core frame 100 makes up the lower portion of the vehicle cabin and comprises floor 200, rocker extrusions 201, tunnel extrusion 202, front cross member extrusion 203, rear cross member extrusions 204, front heat forms 205, rear heat forms 206, front dash 207, rear bulkhead 208, seat support brackets 209, side bulkhead 210, A-pillar gusset 211, front support braces 212, tunnel cover plate 213, and A-Pillar members 216. Additionally, as shown in FIG. 2a, the core platform contains the front bumper armature 214 and front crush rails 215. Energy mitigation structure is not shown in FIG. 2b or 2c because in these embodiments the corresponding components are features of the front sub-frames 101' and 101" which are welded together prior to being bolted as full subassemblies to the core frame 100' and 100", respectively. The front sub-frame 101 comprises front castings 300, cross members

Figure 3B:
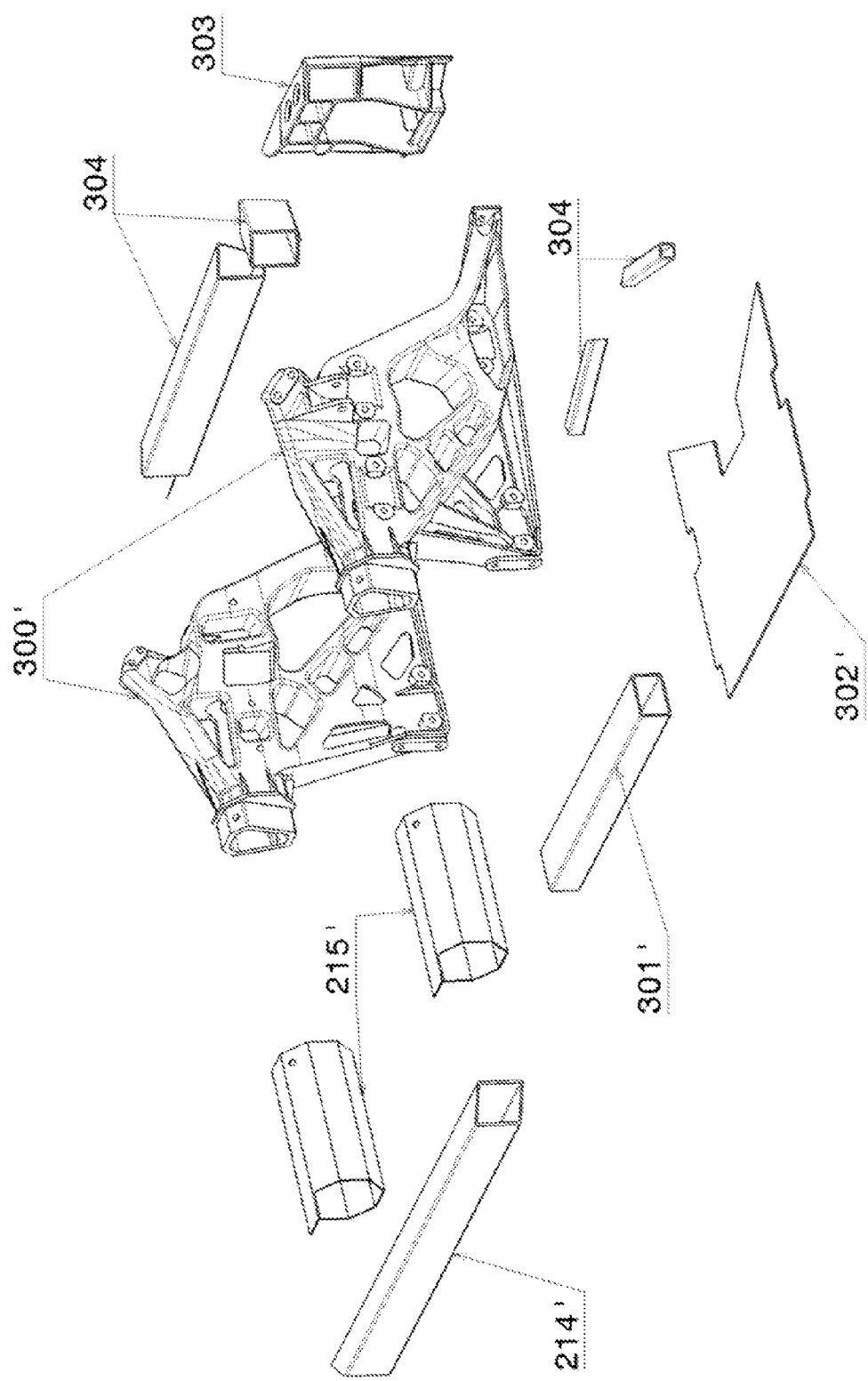
Figure 3C:
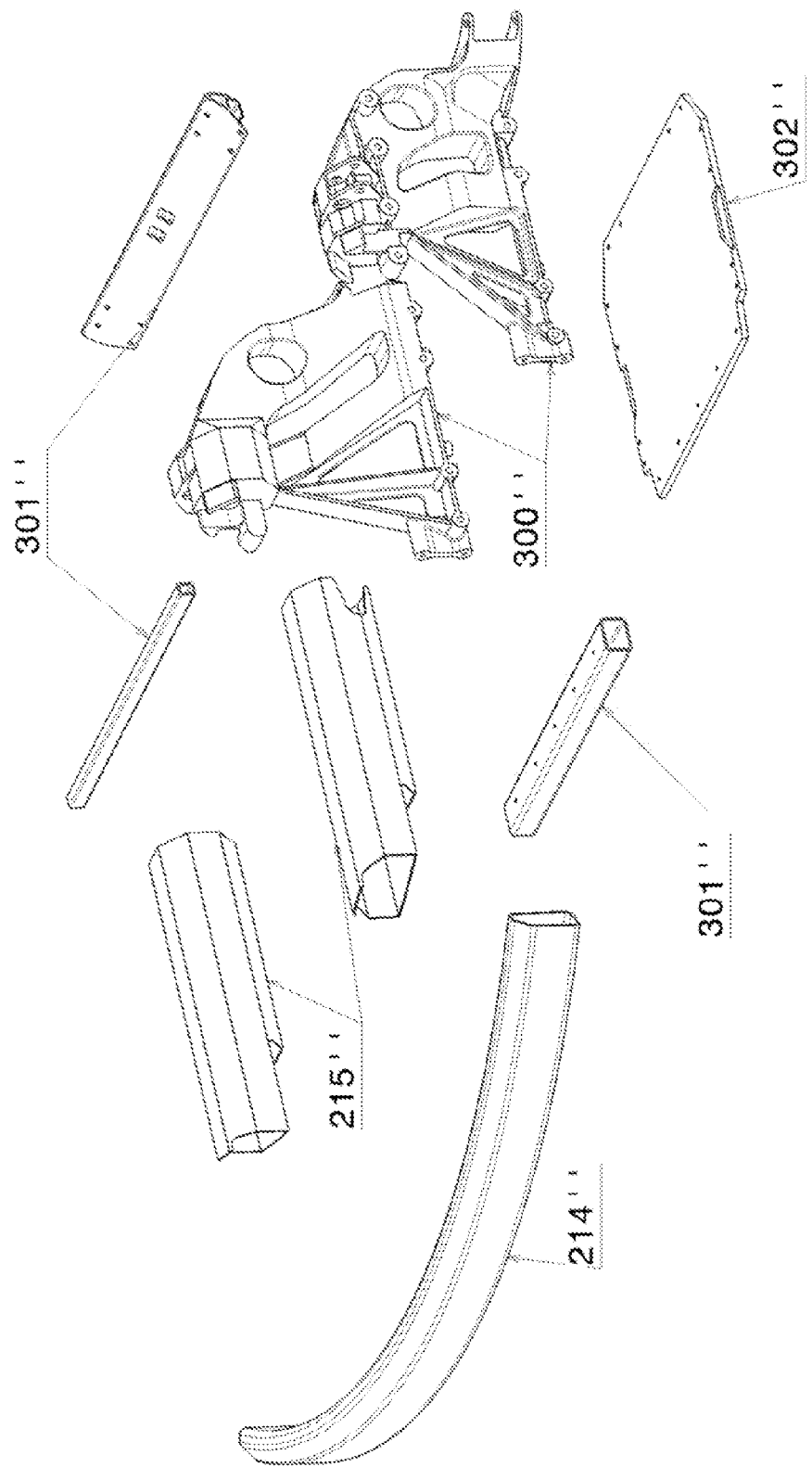
Figure 4:
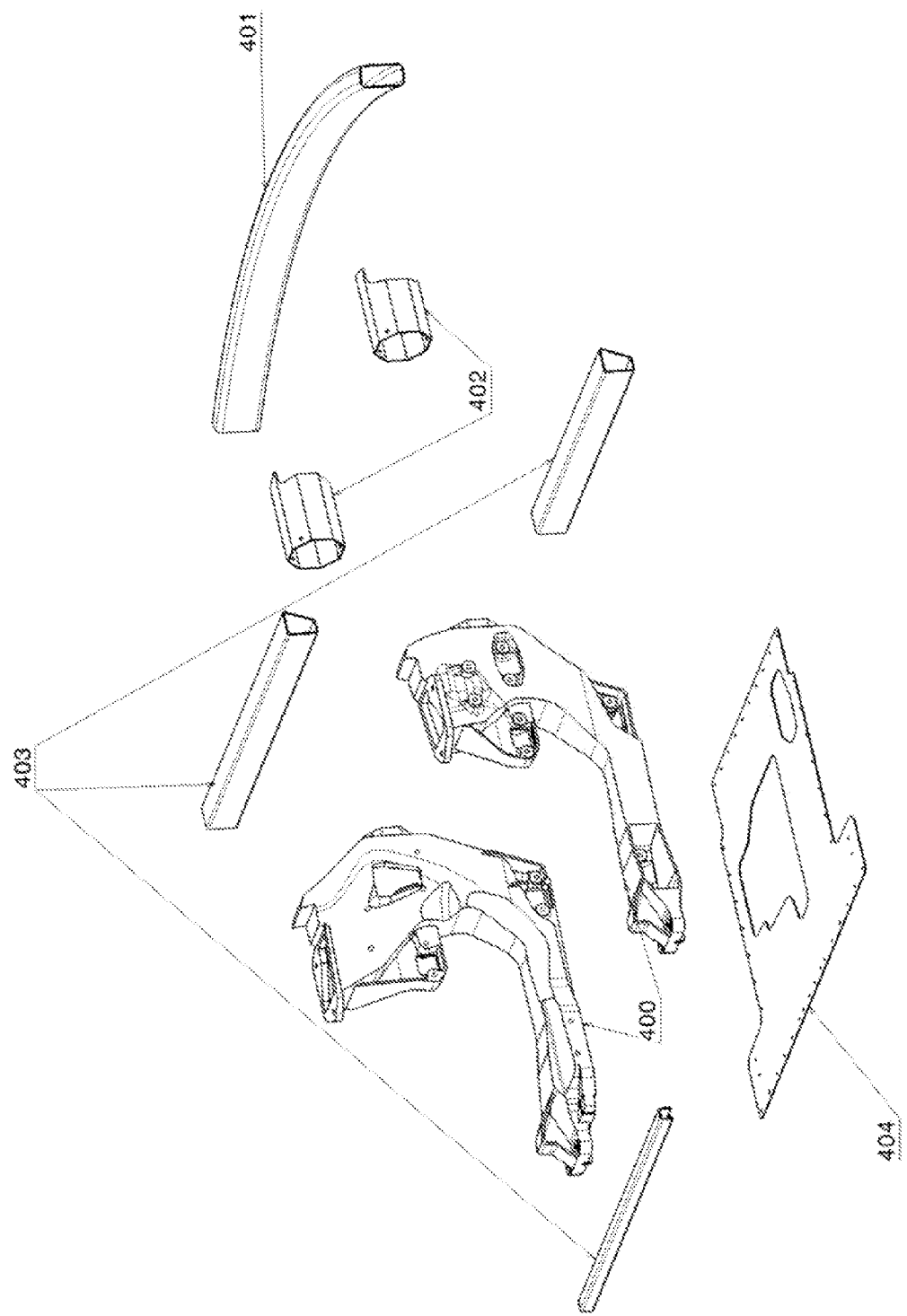

301, and front shear plate 302 as shown in FIG. 3*a*. The front sub-frame 101' comprises front castings 300', cross members 301', front shear plate 302', front bumper armature 214', and front crush rails 215' as shown in FIG. 3*b*. The front sub-frame 101" comprises front castings 300", cross members 301", front shear plate 302", front bumper armature 214", and front crush rails 215" as shown in FIG. 3*c*. The rear sub-frame subassembly 102, 102', 102" is welded together and is bolted to the core frame. In the embodiment of FIG. 4 the rear sub frame 102 is comprised of the rear castings 400, rear bumper armature 401, rear crush rails 402, cross members 403, and rear shear plate 404 as shown. The rear bumper armature 401 is welded to the rear crush rails 402 which are subsequently bolted to the rear castings 400.

Figure 5:
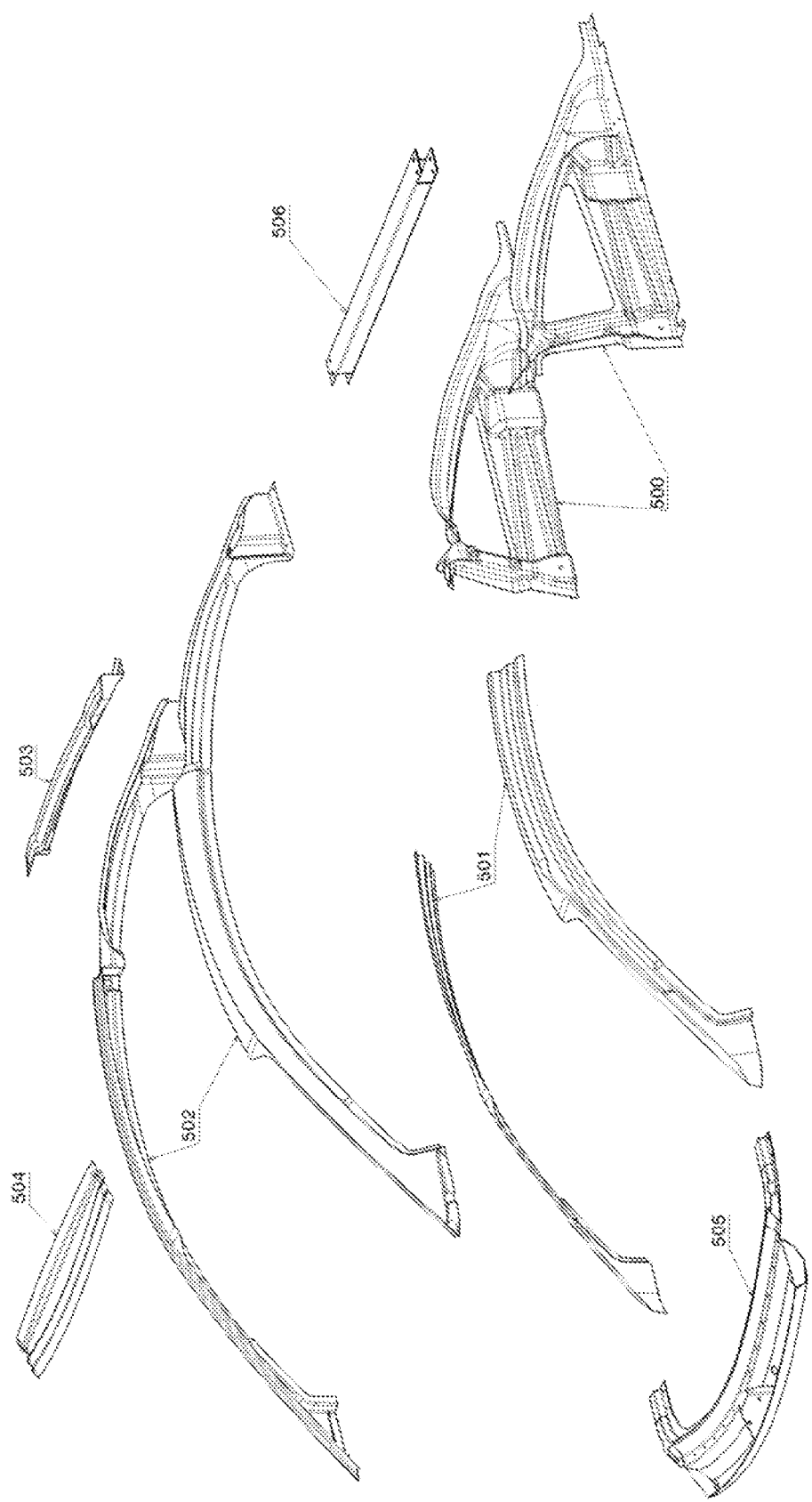

The above-described parts create the basic structure of the vehicle and have an emphasis on component forming techniques other than stamping to remove the high associated investment costs where highly formed parts are not necessary to provide the required function. In a currently preferred embodiment, the roof sub-system 103 (FIG. 1), can be made of stamped structural panels, composites, and/or extruded aluminum and is flexible in design by the nature of bolting to the core frame, and comprises inner rear roof rail 500, inner front roof rail 501, outer front rail 502, rear cross bow 503, front cross bow 504, front cowl 505, and rear cross member 506 as shown in FIG. 5. The panels are stamped to provide the structure required, but with the form necessary to meet a stylized design, as these panels are part of the exterior surface. In addition to the current embodiment disclosed herein, the roof structure could also be constructed from composite materials as well as extruded aluminum. In all of these cases the roof construction method is not critical provided that any exposed structure can be coated and/or painted at a component level and then the trim elements applied prior to the subassembly being bolted to the core frame. The assembly sequence of starting with the core frame, and then attaching the fully built up front and rear sub-frames, installing the full vehicle interior, and then attaching the built out roof assembly enables a drastically simplified assembly process in which the vehicle is built from the inside out with a vehicle system level focus on ease of assembly.

Figure 6:
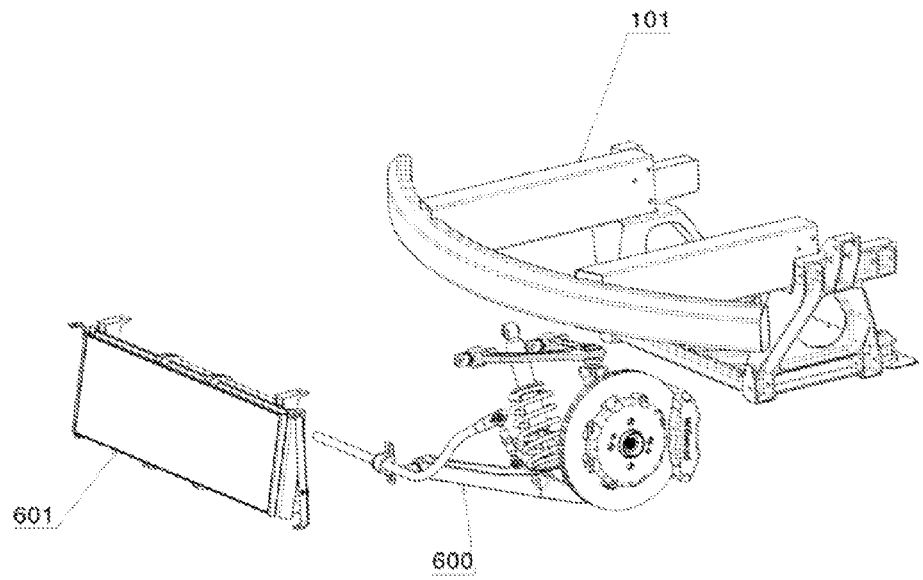
FIG. 6 is an exploded perspective view of the assembled front sub-frame shown in FIG. 1a but with some of the more critical trim elements that are added thereto prior to bolting of the front sub-frame assembly to the core frame.
Figure 7:
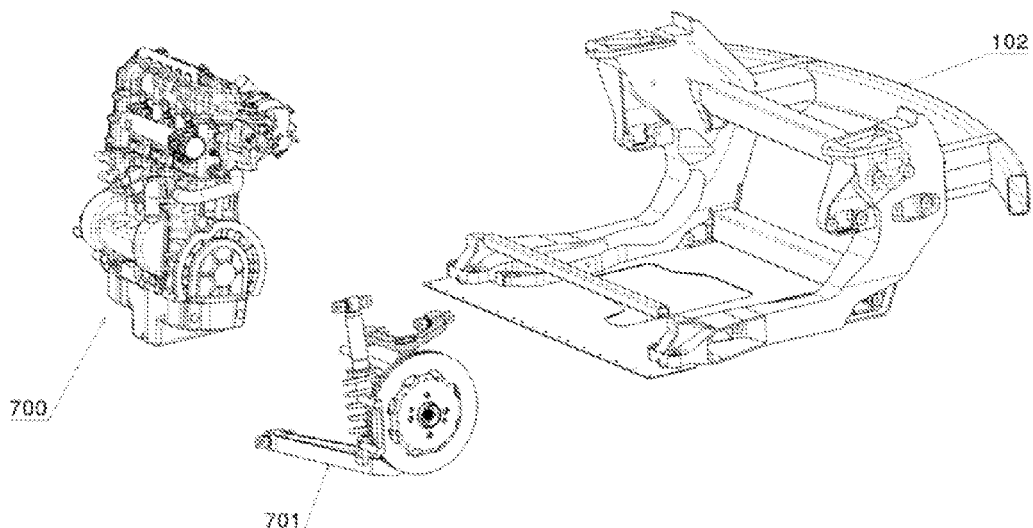
FIG. 7 is an exploded perspective view of the assembled rear sub-frame shown in FIG. 1a but with some of the more critical trim components that are added thereto prior to bolting of the rear sub-frame to the core frame.
Figure 8:
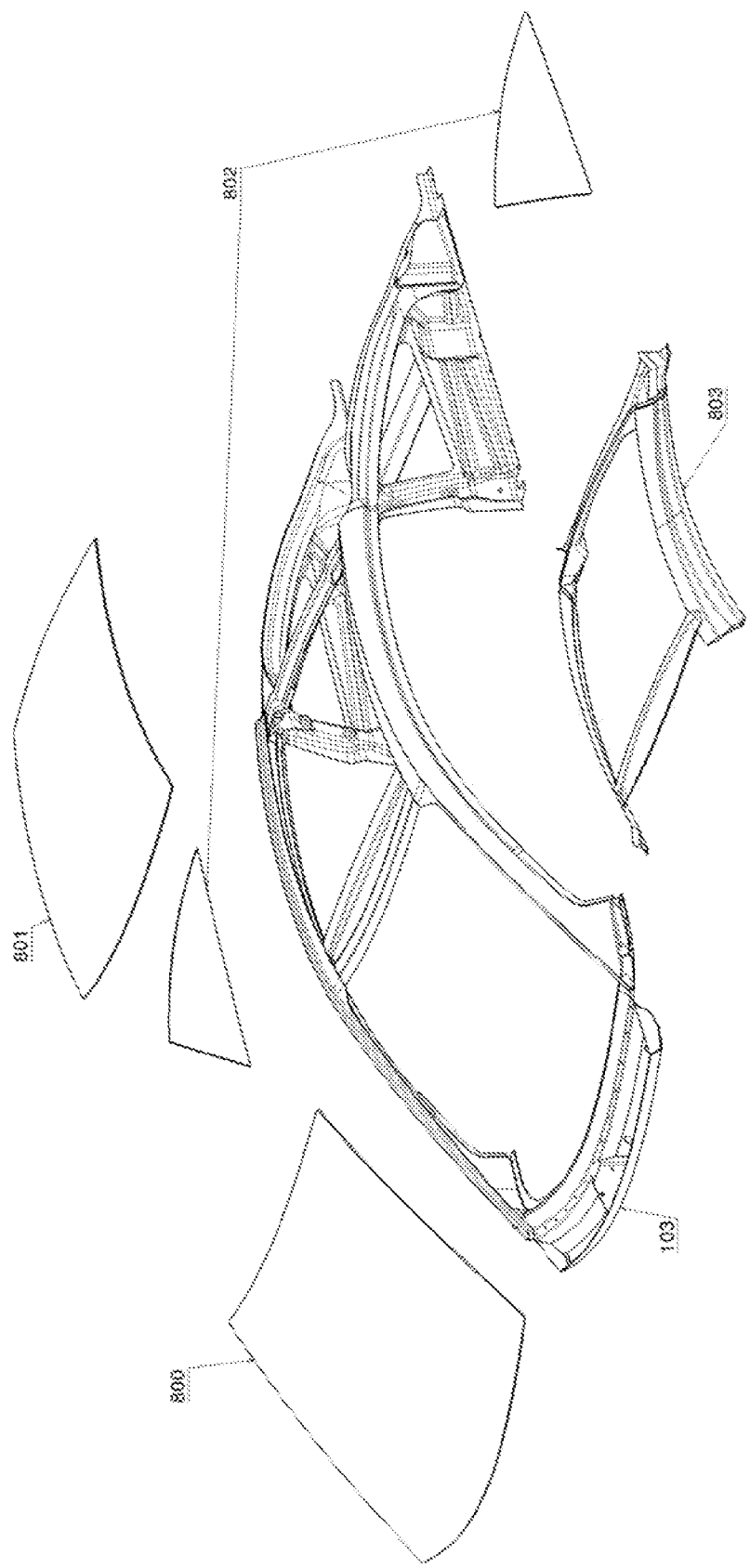
FIG. 8 is an exploded perspective view of the assembled roof subassembly shown in FIG. 1a but with some of the more critical trim components that are added thereto prior to bolting to the core frame.
Figure 9:
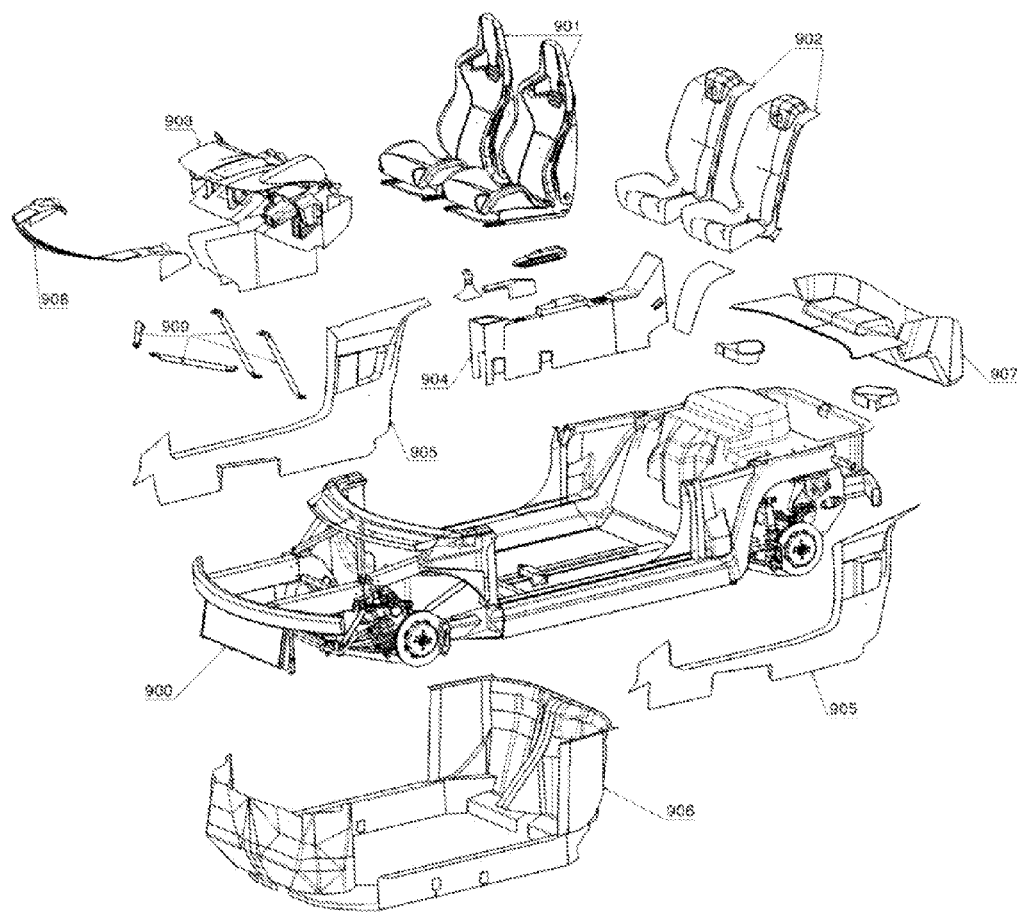
FIG. 9 is an exploded perspective view similar to FIG. 1a but with a majority of the interior trim elements that are installed prior to roof installation on the core frame.

The core frame 100 shown unassembled in FIG. 2*a* creates the lower part of the vehicle cabin as a sealed out structure assembled from an assortment of materials and types of components. As it exists currently, there are formed parts that can be composite or metal, extrusions, and heat forms. These components are attached by a variety of methods including, but not limited to, rivets, bolts, glue, and welds. The variety of attachments keep the manufacturing process flexible to design and material but does not force the core frame build to use a weld intensive body shop as is the case under a conventional manufacturing process. The same philosophy holds true for the front and rear sub-frames 101, 101', 101" and 102 shown unassembled in FIGS. 3*a*-3*c* and FIG. 4, each of which are welded together as subassemblies and coated so the trim components can be attached. The entire subassemblies of these sub-frames with their structure and attached components are then bolted to the core frame as a single front, in the case of the 101, 101', and 101" sub-frames, and a single rear unit for the 102 sub-frame. The fact that these structural assemblies can be provided with trim and other components as shown in FIGS. 6-9 before they are assembled into the full vehicle structure is a key departure of this assembly process and vehicle architecture from conventional automotive manufacturing processes. In this connection, the front sub-frame subassembly 101 shown in FIG. 1*a* is shown in FIG. 6 with some of the critical trim components, namely front SLA suspension and brakes 600, and radiator and fans 601, to illustrate that the structure is built up with components prior to being bolted to the core frame. Similarly, the rear sub-frame 102 shown in FIG. 1*a* is shown in FIG. 7 with some of the critical trim components, namely rear SLA suspension and brakes 700, and engine 701, to illustrate that the structure is built up with components prior to being bolted to the core frame 100. The roof subassembly 103 is shown in FIG. 8 with some of the more critical trim components, namely windshield glass 800, roof glazing 801, side quarter glazing 802, and headliner trim 803, to illustrate that the structure is built up with components prior to being bolted back to the core frame. Before the roof system 103 is bolted to the core platform 100, however, the majority of the interior trim components, including hard trim and any noise, vibration, and harshness (NVH) padding, are installed (FIG. 9). These include the front seats 901, rear seats 902, instrument panel 903, center console 904, side trim 905, interior cabin NVH 906, rear bulkhead NVH 907, windshield adapter 908, and instrument panel strut braces 909. This methodology enables assembly access for interior trim and component installation.

The variety of functions and requirements across these subassemblies and the manufacturing process that dictates part creation prior to shipment to the assembly plant means that each can also undergo a coating or painting process as appropriate prior to delivery. Hence the ability to remove the investment intensive processes of coating and painted with the supply base. Exposed parts can be painted while non-visible parts only need to be coated but both the coating or painting can be performed in existing supplier or business partner facilities thus removing the need for highly capitalized painting and coating facilities on site.

Another major feature of the present invention is the vehicle architecture itself. The vehicle is not only a series of subassemblies bolted to one another but the platform is easily adjustable for overall length and width, and capable of adopting a variety of designs or body surfaces. The chosen architecture deviates from the conventional stamped panel construction to more closely resemble a spaceframe, with the exception of the roof system where the panels can be stamped. While spaceframe construction is generally known, the frame of the present invention is, unlike known spaceframe configurations. This spaceframe architecture has a core platform at the center of the vehicle's structure but with flexibility to also include a stamped roof design which provides structure but attaches like a trim component. This means that the vehicle is a combination of a spaceframe core platform that makes the lower portion of the vehicle structure and an upper stamped body construction that makes the upper portion of the vehicle structure. The core platform consists of straight aluminum extrusions in both the longitudinal and transverse directions, the lengths of which can be changed, altering the length and/or width of the platform. This allows the platform to accommodate a range of different vehicle sizes (differing width and length) and can provide for vehicles in multiple vehicle segments or an increase in seating and/or cargo capacity of the vehicle without significant additional tooling costs. In the case of overall dimension changes to the platform, the roof panels would be the only structure to require retooling. Given that this would happen by the nature of the styling changes to match the new size, these costs are less of an additional cost to grow that vehicle and more the cost of a new design style.

Figure 10:
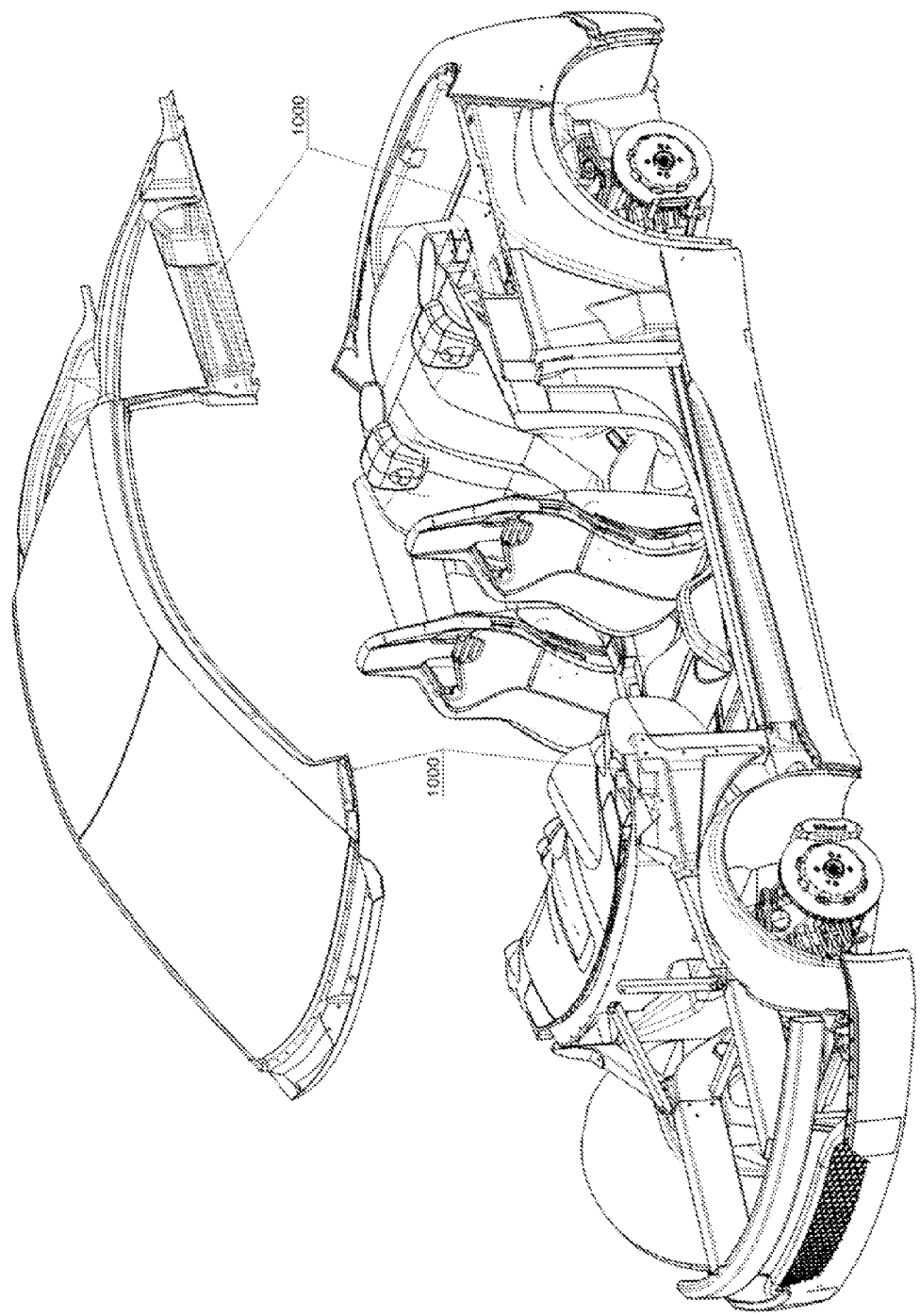
FIG. 10 is a perspective view showing the front and rear sub-frames bolted to the core frame and demonstrates where the roof and core frame meet and are sealed.

The vehicle architecture disclosed herein provides the ability to change the look or styling without modifying the basic structure. There are two levels of changes: one that affects the roof subassembly 103 and one that does not. In the former, the vehicle can be changed to look like a completely different vehicle, even the pillars and glass shapes can move, without a single change to the core platform. In the latter, a retooling of only the body panels can drastically change the look of the vehicle but without modifying the roof structure. Either case provides for a more significant changeover than the typical, industry model year refresh because more panels can be changed since they do not add structurally to the vehicle. This would also enable the unique ability to update the look of a used vehicle to a more recent design by simply swapping the panels, provided that the attachment points are fixed between the designs. This is true even for the case of an updated roof design because the roof subassembly 103 and the core frame 100 meet at a common height and common plane 1000 so that the former can be attached across the top of the core platform as shown in FIG. 10. This allows a modified design to attach through common, existing points, keeping the core platform common and independent of styling under a significant range of design changes.

Figure 11:
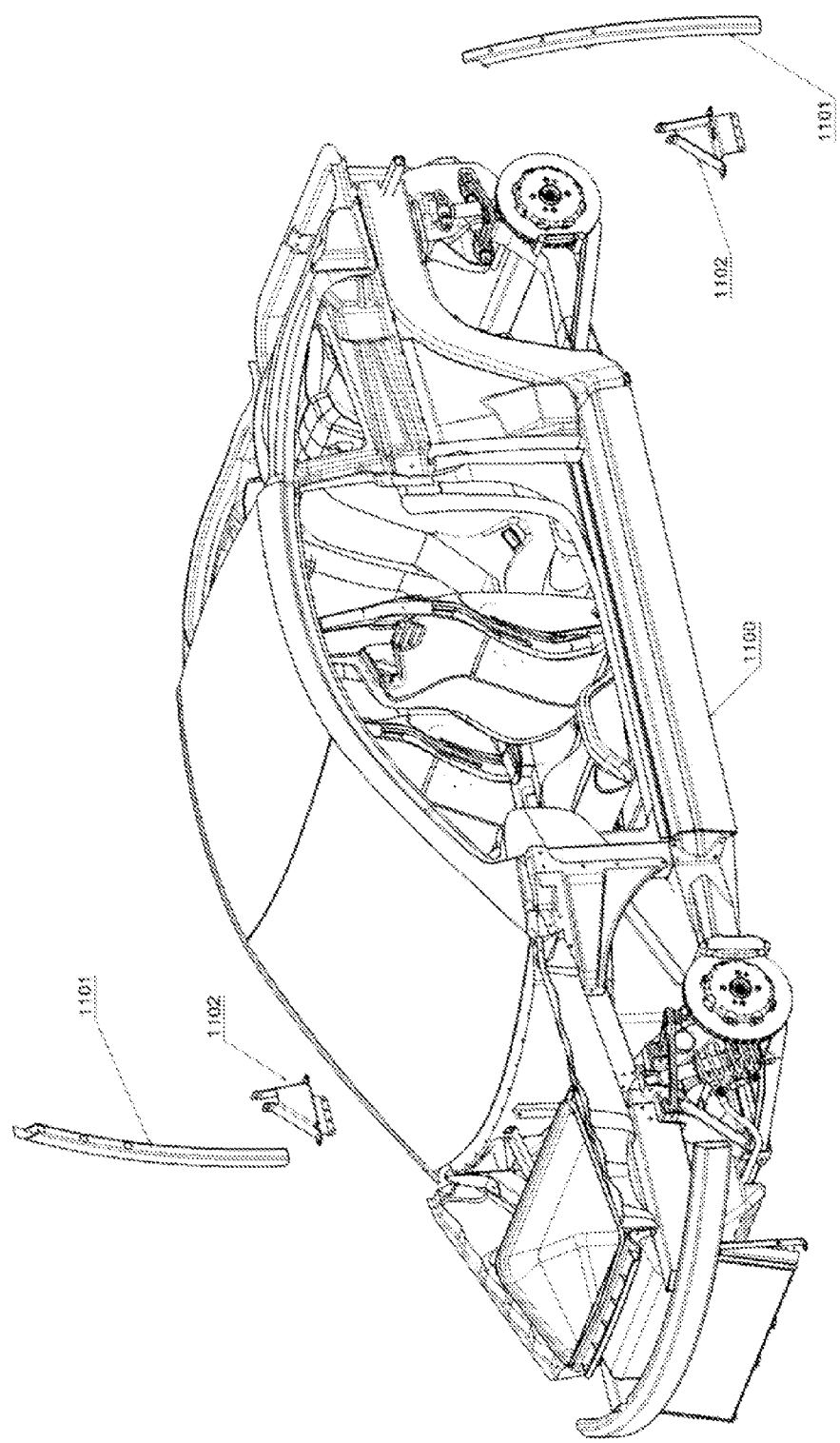
FIG. 11 is a perspective view of the four components shown in FIG. 1a with the added trim shown in FIGS. 6-9 assembled and the B-pillar structural beam shown exploded from the assembly.

After the roof is installed the B-pillar structure, created by a constant section beam with a constant radius bend and comprised of a B-pillar extrusion 1101 and B-pillar rocker brace 1102, can be bolted to the core platform as shown in FIG. 11 after the roof 103 has been assembled to the platform 100. This unique attribute of this additional bolt on structure further provides for flexibility in the platform, not only for platform size in that the B-pillar can move along the rocker extrusion 201 (FIG. 2a) to adjust the door opening size but also in that the pillar can be moved to maintain the basic platform but convert to a four-door variant. This is also the case with the embodiments of FIGS. 2b and 2c. The structural B-pillars are the last components that need to be installed prior to the closure panels being hung and the body panels being attached. This is another critical departure from the conventional methods of vehicle assembly in which the structure is in place prior to painting and attachment of trim components. It is important that, other than the openings for the side doors and rear hatch, the structure is a completely sealed chamber prior to the installation of the B-pillar. In the current embodiment, the structure of the B-pillar is a continuous section of high strength steel capable of managing side impact and also assisting in managing roof crush loads between the lower structure of the rocker and the upper structure of the roof rails. The B-pillar structure is attached back to the vehicle without violating the seal of the vehicle cabin. The modular B-pillar also enables easier repair than a traditional unitized body structure in the event of a side collision.

In addition to the ability to change the platform size at little cost, the spaceframe architecture as described allows for material geometry to be put only where it is needed as a load path. This can be based on driving performance criteria, crashworthiness and occupant protection, or any number of other quality-driven reasons. The ability to put structure only where it is needed creates a vehicle that can match or outperform the stiffness and safety of stamped panel construction while providing a significant reduction in total vehicle weight. All of this creates a platform that can change size for minimal tooling capital, can change styling or appearance easily, is relatively low cost to manufacture, can be easily repaired, and has a significant weight reduction compared to conventional vehicles.

As a method of attaching adjacent extrusions, the present invention features the unique application of heat formed tubes or nodes (205 in FIGS. 2a and 205" in FIG. 2c are the front heat forms and 206 in FIGS. 2a and 206" in FIG. 2c are the rear heat forms) to work as structural nodes rigidly securing various components and transferring loads between the other structural members of the vehicle. Structural integrity is critical to a vehicle's performance and some of the biggest impacts to the strength and stiffness of a space frame vehicle are the ways in which the load carrying members are attached. In the spaceframe architecture described herein, this means joined extrusions of different cross sections to one another while packaging around vehicle hard points and incorporating additional load carrying or load transferring members. The unique application of the heat formed tubes provides a lightweight method of achieving all of these tasks.

The front heat form node 205, as shown in detail from all sides in FIGS. 15a-15e, is employed in the embodiment of FIGS. 1a, 2a, and 3a as the front torque box integrating the rocker 201, front cross-member 203, front crush rails 215, and A-pillar members 216 (FIG. 2a) and provides a mounting surfaces to join and transfer load from the front sub-frame 101. The heat form tube transfers the driving and vehicle loads that the front suspension 600 (FIG. 6) imparts on the front castings 300 (FIG. 3a) back to the rocker extrusion 201 (FIG. 2a) of the core frame 100 (FIG. 1a). As shown in FIG. 2a, the heat form tube 205 acts as a three dimensional node, attaching the A-pillar members 216 and allowing torsional loads in the front end to be transferred across the vehicle. The core frame 101 (FIG. 1a) is also able to use the complex surface of the node to seal out the vehicle cabin because the front dash 207 (FIG. 2a) is bonded to the top of the heat form node 205 where it completes the perimeter structure of the floor 200. By providing robust attachment points and putting the material of the node where it is needed for structure, the heat form configuration creates a three dimensional element that is a combination of a simple node and a load carrying member that integrates elements of different sizes and materials beyond what traditional nodal members are capable of achieving. Acting as the front structural module, the heat form node 205" (FIG. 2c) can be employed separate from the crush rails to manage the loads of the core frame 100" (FIG. 1c) while providing an interface to the front sub-frame 101" (FIG. 1c) without managing the load directly from the crush rails 215" (FIG. 3c). By utilizing a more complex front casting 300' (FIG. 3b), the heat form node can be removed, but this leads to the linear cross members 201', 212' and 304' of FIGS. 2b and 3b that are not ideal for joining and emphasizes the advantage of the complex three dimensional node while showing that the core frame 100' (FIG. 1b) can still be executed without this component.

The rear heat form node 206, as shown in detail from all sides in FIGS. 16a-16e, is currently contemplated as the rear rocker rail extension integrating the rocker 201, side bulkhead 210, and rear cross members 204 as shown in FIG. 2a, and provides a mounting surfaces to join and transfer load between the roof assembly structure 103 and rear sub-frame 102 (FIG. 1a). In addition the top of this heat formed node provides a sealing surface as it interfaces to the side bulkhead 210 (FIG. 2a) and roof rail inner rear 500 and roof rail outer 502 (FIG. 5) as they comprise the roof subassembly 103 (FIG. 1). The heat form tube transfers the driving and vehicle loads that the rear suspension of 701 (FIG. 7) imparts on the rear castings 400 (FIG. 4) back to the rocker extrusion 201 (FIG. 2a) of the core frame 100. The combination shown in FIG. 2a of rocker extrusion 201, front heat form 205, and rear heat form 206 links the platform structurally between the locations where the driving loads of the suspension go into the platform. These connect and all three components are thus made integral to longitudinal load transfer along the vehicle. The core frame 100 (FIG. 1a) uses the complex surfaces of the node as it completes the perimeter structure of the floor 200 in FIG. 2a because the rear bulkhead 207 is bonded to the top of the heat form 206 creating a sealed cabin. As with the front end, the rear heat form 205 (FIG. 2a) can be removed leading to a core frame 100' (FIG. 1b) that is functionally the same but without the optimized structural paths and rigid joints that the heat form node provides.

The separate subassemblies that make up the vehicle platform are also critical to the powertrain flexibility and overall vehicle reparability. The rear sub-frame 102 (FIG. 1a) specifically, which houses the engine and transmission, is designed such that it can hold a variety of engines and powertrain types in a location that packages to the rear occupants. If the powertrain options change, then the vehicle can adapt to the new powertrain by making changes at the sub-frame level. This allows a major configuration change to have a smaller reaching impact to the vehicle and the number of parts affected and thus allows the spaceframe to accommodate virtually any type of powertrain including gasoline, diesel, gas-and-diesel hybrid, plug-in hybrid, natural gas, and full electric with minimal changes to the rear sub-frame assembly. This again permits power plant flexibility without significant additional tooling costs and with relatively minimal engineering effort. The fact that these subassemblies bolt into place also means that they then can unbolt for service or replacement. Using frontal impact as an example, the front crush cans are designed to manage the loads of a frontal collision. This means that if the front sub-frame with these crush rails and attached trim are the only parts damaged then the sub-frame can be unbolted from the rest of the vehicle structure and replaced. This drastically limits the cost of repair and likelihood of the vehicle being declared 'totaled' from the collision.

Figure 12:
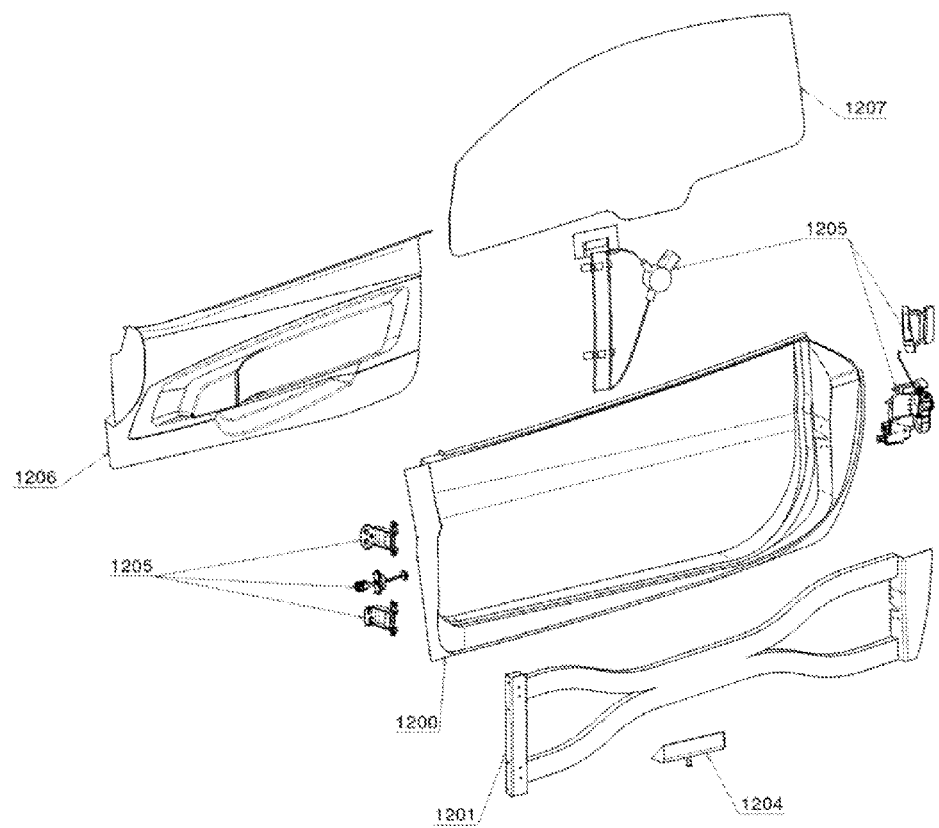
FIG. 12 is an exploded perspective view of the side showing internal door components used in conjuncture with the embodiment of FIGS. 1a-1c.

Closely related to the unique overall architecture is the design feature for body panels that are non-functional. By making them non-functional they can be quickly replaced as mentioned. The only functions that these panels provide are vehicle styling and aerodynamics. The non-functional body panels enable the unique assembly methodology of building a side door from the inside out. A one piece, frameless door inner is used as the framework to locate and secure all of the door components as shown in FIG. 12. These components, namely door inner panel 1200, hinge reinforcements 1201, latch reinforcements 1202, door beams 1203, door hardware 1204, door catch bracket 1205, door trim panel 1206, and side door glass 1207 are a few of the critical door components added to the door inner region prior to the door outer region installation and can be added before or after the door is hung to the vehicle. This list does not constitute the full list of door components but is set with FIG. 12 to illustrate the advantageous assembly process of installing these components prior to the outer region of the door being closed off with an exterior body panel. Because the assembly of components happens before the outer panel is in place, the wire harness, window regulator and track, latch reinforcement, door latch, door beams, and all other door components that are housed internal to the finished door cavity can all be loaded from the outside and bolted to the door inner region. The door beams 1203 are a series of welded beams that transfer load into the hinges at the front of the door and the latch at the rear during side impact. The door beams provide all of the safety structure for side impact. This provides a level of design flexibility and material selection by removing the impact structural load requirements from the inner panel, thus making the inner only handle the functional loading and sealing of the door opening. In addition, the design of the door beams force any deformation back to the structural pillars of the body. The ability to fit this beam structure into the door again relies on the installation of the beam prior to the door outer region installation. In a traditional door assembly, this installation is done in a body shop, but in the present invention the beams are welded together to form a single bracket which is then only bolted to the door inner region. By making part of this bracket also function as the hinge reinforcement, load is allowed to transfer directly from the hinge to the beams and the door inner panel itself becomes a less structural member. All of these components can be either added before or after the door is hung to the vehicle. The present invention contemplates having the full door assembled and tested before being assembled to the full vehicle. Without having the door outer region in place, the wire harness can also be accessed from the outside of the door, allowing for easy testing of the window and other electronic door systems during manufacturing. Once the door seals and glass are added to the door structure and the door subassembly is hung to the body, the door is fully sealed to the body, again without the door outer panel. The ability to load components from the outside prevents the need for large holes in the door inner portion that act as access holes for passing trim components into the door cavity. This also removes the need for a large watershield or a module to seal these access holes.

Figure 13:
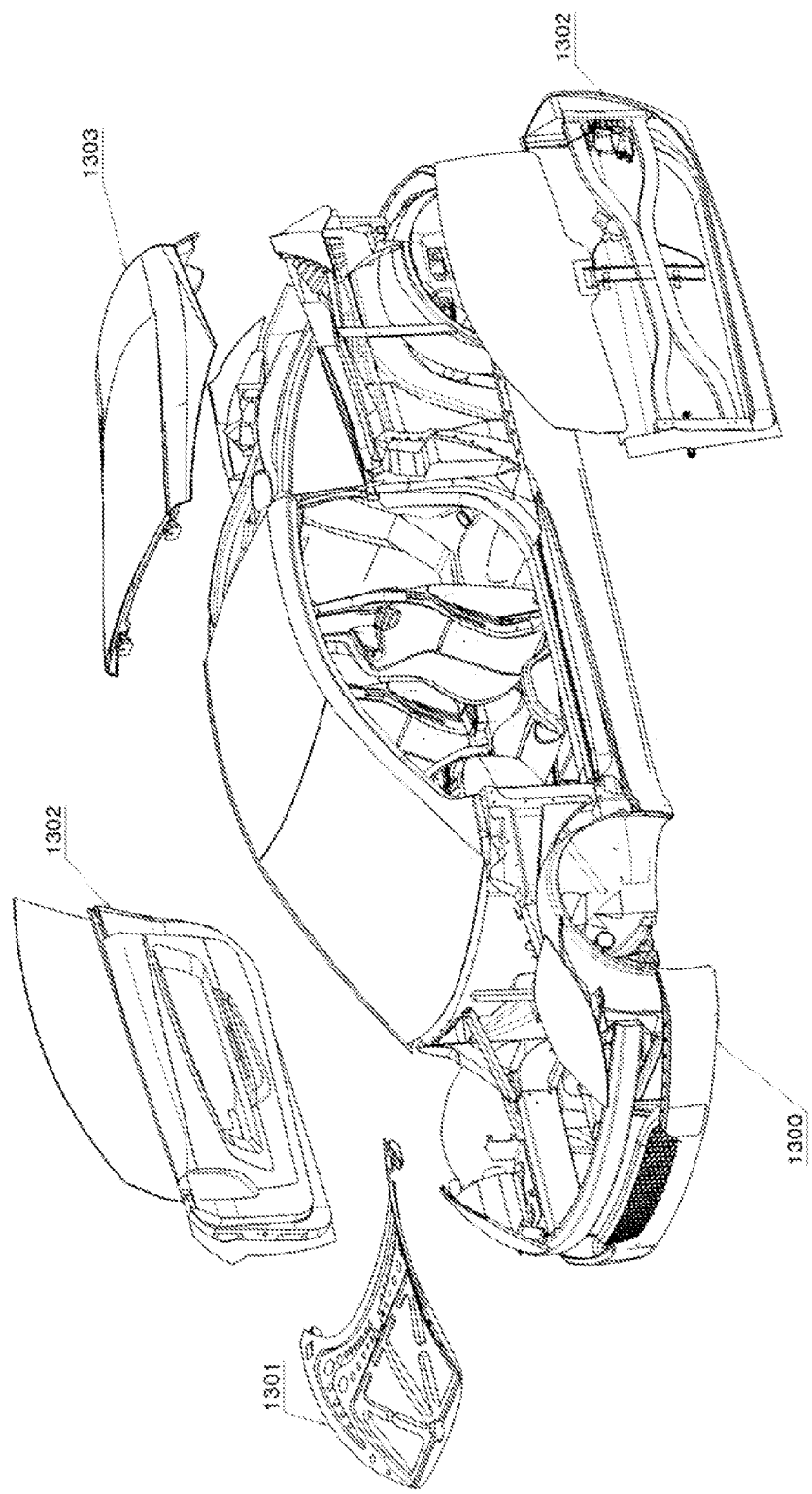
FIG. 13 is a view similar to FIG. 11 but showing the common color exterior body panels installed to the vehicle and the closure subassemblies exploded from the full vehicle assembly.
Figure 14:
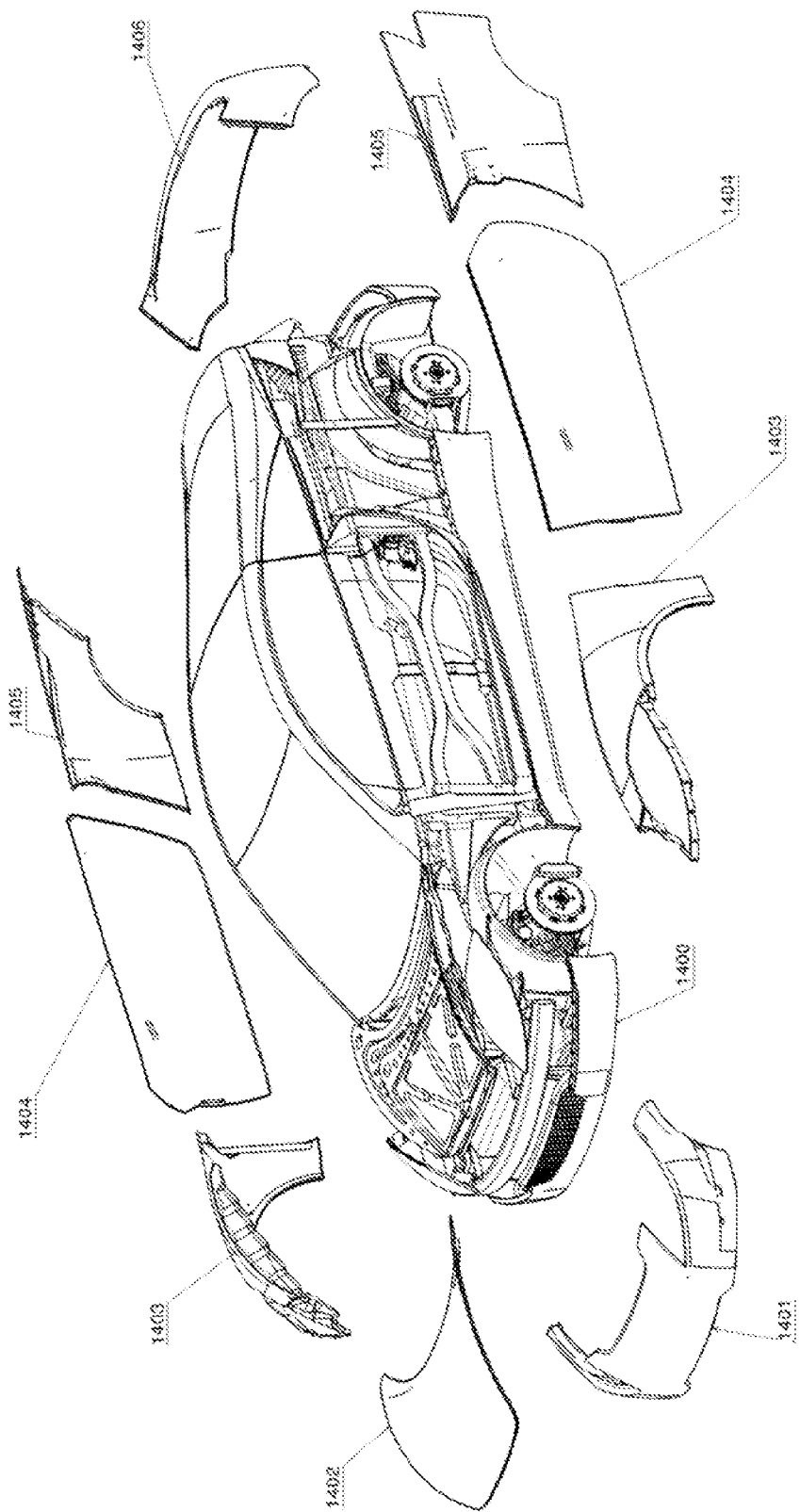
FIG. 14 is a view similar to FIG. 13 but showing the closure subassemblies installed to the vehicle and the painted exterior body panels exploded from the full vehicle assembly.
Figure 19:
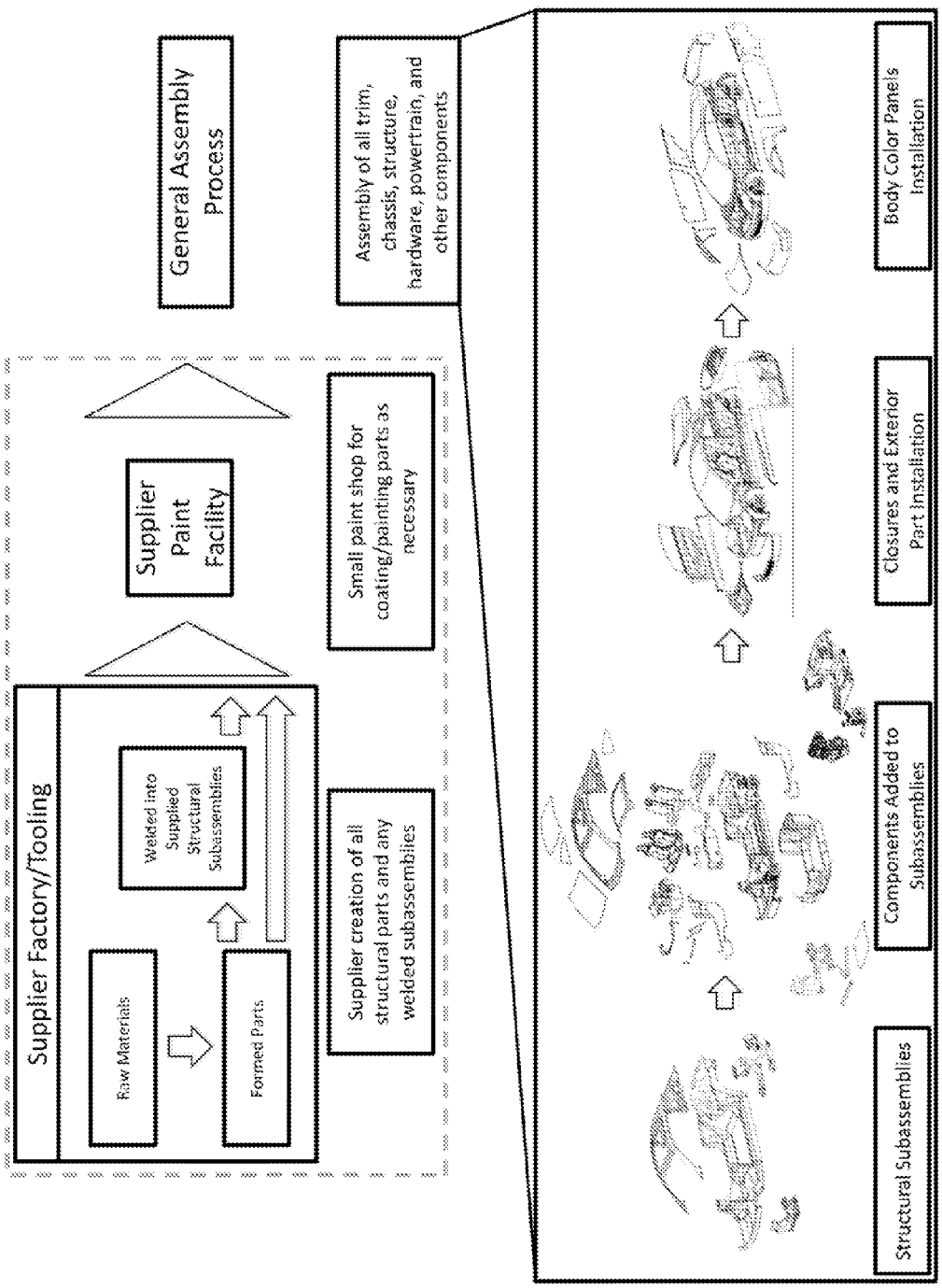
FIG. 19 is a flow diagram showing the assembly flow process of the present invention for producing the unique vehicle architecture hereinafter described in greater detail.

The exterior body panels fit in one of two groups, common color panels or body color panels. The common color exterior panels are shared across all vehicles of the same variant and are used to locate the body color panels and secure them back to the vehicle. In the currently preferred embodiment, the vehicle's exterior body panels are a combination of nine painted, injection molded body panels along with five common colored panels. Prior to the installation of the body color panels the closure panels are hung to the otherwise assembled vehicle 1300 shown in FIG. 13 complete with all of the common color body panels. The closures panels include the structural hood inner and reinforcement assembly 1301, trimmed side door assemblies 1302 without exterior body panel, and fully assembled liftgate 1303. With the closures panels attached to the vehicle, a fully scaled vehicle that could be driven, shipped, and otherwise is completed, missing only the non-functional body panels that define the body form and color as previously listed. The body color panels define the vehicle color and style, and are the front fascia 1401, hood outer panel 1402, the front fenders 1403, front door outer panels 1404, the rear quarter panels 1405, and the rear fascia 1406 shown in FIG. 14.

The ability to install all of the exterior body color panels after the completion of the vehicle assembly, provides the opportunity to ship vehicles to dealerships without the outer panels such that the body color is determined and appropriately applied at the point of sale. This allows a dealership or place of sale to reduce inventory by customizing the vehicle color at the point of sale to match customer orders. The customer can come to the point of sale and within an hour have the panels installed with the desired color. The problem presented is that the plant is not able to certify build quality on the panels that are added after the vehicle is shipped from the plant. This is addressed by having the series of panels encompass the lower perimeter of the vehicle. Because such panels are common to all vehicles, they can be assembled at the plant without affecting the end color and used as control points for the attachment of the other panels. In the inventive method disclosed here, the common colored panels which are installed in the assembly plant can be used to control the fits, including flushness and gaps, of the colored panels. By attaching the non-closure panels to each other (fenders to fascia and front bumper and rear quarter panels to rear bumper, rear fascia, and diffuser) at the edges of the parts, they are able to maintain very tight fit and finish. Instead of attaching the panels back to the structure or making them a part of the structure, they are able to act more like a single large panel, rigidly fixed around its perimeter, without providing any function other than to provide vehicle styling.

While the preferred embodiments of the invention have been illustrated and described, it should be understood that, after reading this disclosure, variations to this embodiment will be apparent to one skilled in the art without departing from the principles of the invention described herein. This applies to all of the following claims:

We claim:

1. A method of assembling a high-strength-per-unit-weight spaceframe-like vehicle comprising: bolting together a plurality of subassemblies to form a spaceframe core platform; bolting a roof structure assembly of formed, extruded or stamped components to the core platform; installing closure structural panels and body panels that are common to a vehicle family; and thereafter installing a series of non-structural colored exterior panels defining a vehicle body color and having only aesthetic and aerodynamic functionalities as the last assembly step in one of the plant and outside the plant.

2. The method of claim 1, further comprising installation of interior components including at least one of trim, hardware, seats and vehicle operating systems in the core platform prior to bolting of the roof structure assembly to the core platform.

3. The method of claim 2, wherein a B-pillar structure is bolted, at a selectable location based on the vehicle family, to the core platform after the installation of the interior components such that loads imposed on the B-pillar structure are transferred from the roof structure assembly to a rocker of the vehicle and from a door latch of the vehicle's front door into the spaceframe core platform.

4. The method of claim 1, wherein the core-platform is made of three subassemblies in which the first of the subassemblies is a front subassembly having suspension castings, a front bumper armature, front crush rails, and cross members; the second of the subassemblies is a core frame comprised of floor panels, structural rockers, center tunnel, cross members, heat form nodes, front dash, rear bulkhead and seat support brackets; and the third of the subassemblies is a rear subassembly containing suspension castings, a rear bumper armature, rear crush rails and cross members.

5. The method of claim 1, wherein the core-platform is made of three subassemblies in which a first of the subassemblies is a front subassembly having suspension castings and cross members; a second of the subassemblies is a core frame comprised of floor panels, structural rockers, center tunnel, cross members, heat form nodes, a front bumper armature, front crush mils, front dash, rear bulkhead and seat support brackets; and a third of the subassemblies is a rear subassembly containing suspension castings, a rear bumper armature, rear crush rails and cross members.

6. The method of claim 1, wherein the design of a member used as an integral part within a vehicle structure is a complex formed member which originates as a tube, extrusion or columnar form, and is developed as a three dimensional form to integrate with, or interface to, other adjacent, primarily linear, parts, or members, and improves the inherent strength and stiffness of the spaceframe through improved sectional performance of the member individually and through optimized transfer of loads through the collective members and the joint formed.

7. The method of claim 6, wherein the components facilitate attachment between the adjacent components or members, which otherwise would not be contiguous, and could not easily be made contiguous.

8. The method of claim 1, further comprising configuring the core frame and roof structure assembly to meet at a common height and plane to allow the roof structure assembly to be selectively attached and removed from the core frame.

9. The method of claim 1, further including selectively changing at least one of the length and width of straight extrusion elements comprising the core platform as a method to alter the core platform for track or wheelbase modifications.

10. The method of claim 1, wherein the colored body panels are installed edge-to-edge with each other independently of the spaceframe platform.

11. The method of claim 1, further comprising the installation of frameless side doors, the front hood structure, and the liftgate assembly to the core frame after they are each built into subassemblies complete with trim, hardware, and structure but prior to the addition of the exterior body color panels.

12. The method of claim 11, wherein the colored panels are configured as door panels, front and rear fascia, front and rear quarter panels and front and rear fenders.

13. The method of claim 4, wherein installation of at least one of the front subassembly and rear subassembly includes bolting a rear end of the front subassembly front crush rails to the suspension castings and bolting a front end of the rear crush rails to the suspension castings rails to provide a uniform crash zone.

14. The method of claim 4, wherein installation of the front crush rails to the core frame is effected such that the front subassembly and front crush rails are selectively and independently replaceable.

15. The method of claim 12, wherein the installation of the closure structural panels include bolting on of a front hood inner structure and components, side door inner panels and components, and completed rear liftgate assembly to provide a full vehicle seal exclusively of the subsequently added colored panels.

16. A high strength-to-weight spaceframe-like vehicle, produced by the assembly method of claim 1.

17. The method of claim 1, wherein the common panels are used to position and secure the series of colored panels.

18. A high strength-to-weight spaceframe-like vehicle, comprising: a front subassembly, a core frame and a rear subassembly configured to be bolted together to form a spaceframe core platform; a roof structure assembly of formed, extruded or stamped components configured to be bolted to the spaceframe core platform in a common plane and height; closure panels common to a vehicle family style; and non-load bearing colored panels defining the vehicle body color for providing only at least one of aesthetic and aerodynamic functionalities, wherein the assembled closure panels provide full vehicle sealing once they are attached to the vehicle as subassemblies exclusive of the colored exterior body panels.

19. A high strength-to-weight spaceframe-like vehicle, comprising: a front subassembly, a core frame and a rear subassembly configured to be bolted together to form a spaceframe core platform; a roof structure assembly of formed, extruded or stamped components configured to be bolted to the spaceframe core platform in as common plane and height; closure panels common to a vehicle family style; non-load bearing colored panels defining the vehicle body color for providing only at least one of aesthetic and aerodynamic functionalities, and at least one side door assembly on each side of the vehicle comprised of a one-piece frameless inner door panels, each side door assembly configured to have internal components installable therein from an exterior side of the side door assembly prior to haying at least one colored panels installed thereon.

20. A high strength-to-weight spaceframe-like vehicle, comprising: a front subassembly, a core frame and a rear subassembly configured to be bolted together to form a spaceframe core platform; a roof structure assembly of formed, extruded or stamped components configured to be bolted to the spaceframe core platform in a common plane and height; closure panels common to a vehicle family style; non-load bearing colored panels defining the vehicle body color for providing only at least one of aesthetic and aerodynamic functionalities, wherein the internal components of the side door assembly include door beams joined to the frameless inner door panel such that the inner door panel avoids carrying deformation loads under impact.

* * * * *